United States Patent
Minikey, Jr. et al.

(10) Patent No.: US 10,112,540 B2
(45) Date of Patent: Oct. 30, 2018

(54) FULL DISPLAY REARVIEW DEVICE

(71) Applicant: Gentex Corporation, Zeeland, MI (US)

(72) Inventors: Danny L. Minikey, Jr., Fenwick, MI (US); Richard T. Fish, Jr., Hudsonville, MI (US); Bradley R. Hamlin, Allendale, MI (US); Michael F. Lisowski, Holland, MI (US); Jason D. Hallack, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 59 days.

(21) Appl. No.: 15/157,056

(22) Filed: May 17, 2016

(65) Prior Publication Data
US 2016/0341963 A1    Nov. 24, 2016

Related U.S. Application Data

(60) Provisional application No. 62/163,226, filed on May 18, 2015.

(51) Int. Cl.
*B60R 1/12*    (2006.01)
*B60R 1/04*    (2006.01)
(Continued)

(52) U.S. Cl.
CPC ............. *B60R 1/12* (2013.01); *B60R 1/04* (2013.01); *B60R 1/0612* (2013.01); *B60R 1/072* (2013.01);
(Continued)

(58) Field of Classification Search
CPC .......... G02F 1/15; G02F 1/155; G02F 1/1523; G02F 1/1525; G02F 1/1521; G02F 1/163;
(Continued)

(56) References Cited

U.S. PATENT DOCUMENTS

| 2,131,888 A | 10/1938 | Harris |
| 2,632,040 A | 3/1953 | Rabinow |

(Continued)

FOREIGN PATENT DOCUMENTS

| DE | 102010064082 A1 | 6/2012 |
| EP | 0513476 | 11/1992 |

(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

(Continued)

*Primary Examiner* — Ricky Mack
*Assistant Examiner* — Kristina Deherrera
(74) *Attorney, Agent, or Firm* — Price Heneveld LLP; Bradley D. Johnson

(57) ABSTRACT

A display mirror assembly having a mount operably coupled to a vehicle interior. The mount includes one of a ball and a socket extending forwardly therefrom. An engagement plate is pivotally coupled with the mount via the other of a ball and a socket extending rearwardly from the engagement plate. The engagement plate includes a first support member and a second support member pivotally coupled to the first support member. A carrier plate is operably coupled with the engagement plate. The carrier plate supports a rear housing on a rear portion thereof. A glass element is operably coupled with the carrier plate. A display module is configured to be turned to an on state and an off state. An actuator device is disposed on a bottom surface of the housing and is operably coupled with the glass element. The actuator device is adjustable to tilt the glass element.

19 Claims, 16 Drawing Sheets

(51) Int. Cl.
*B60R 1/06* (2006.01)
*B60R 1/072* (2006.01)
*B60R 1/08* (2006.01)

(52) U.S. Cl.
CPC ...... *B60R 1/087* (2013.01); *B60R 2001/1223* (2013.01); *B60R 2001/1253* (2013.01)

(58) Field of Classification Search
CPC ........ G02F 1/1533; G02F 1/03; G02F 1/0315; G02B 27/0101; G02B 27/0149; G02B 7/198; B60R 1/02; B60R 1/083; B60R 1/088; B60R 1/12; B60R 1/04; B60R 1/087; B60R 2001/1223; B60R 2001/1253; B60R 1/0612; B60R 1/072; H04N 9/3137; H04N 9/22
USPC ........ 359/630, 265–275, 277, 245–247, 254, 359/242, 843, 871–877; 248/474, 479, 248/817; 345/49, 105, 107; 438/929; 701/36, 49
See application file for complete search history.

(56) References Cited

U.S. PATENT DOCUMENTS

| | | | |
|---|---|---|---|
| 2,827,594 A | 3/1958 | Rabinow | |
| 3,179,845 A | 4/1965 | Kulwiec | |
| 3,581,276 A | 5/1971 | Newman | |
| 3,663,819 A | 5/1972 | Hicks et al. | |
| 3,837,129 A | 9/1974 | Losell | |
| 4,109,235 A | 8/1978 | Bouthors | |
| 4,139,801 A | 2/1979 | Linares | |
| 4,151,526 A | 4/1979 | Hinachi et al. | |
| 4,214,266 A | 7/1980 | Myers | |
| 4,236,099 A | 11/1980 | Rosenblum | |
| 4,257,703 A | 3/1981 | Goodrich | |
| 4,258,979 A | 3/1981 | Mahin | |
| 4,277,804 A | 7/1981 | Robison | |
| 4,286,308 A | 8/1981 | Wolff | |
| 4,310,851 A | 1/1982 | Pierrat | |
| 4,357,558 A | 11/1982 | Massoni et al. | |
| 4,376,909 A | 3/1983 | Tagami et al. | |
| 4,479,173 A | 10/1984 | Rumpakis | |
| 4,499,451 A | 2/1985 | Suzuki et al. | |
| D283,998 S | 5/1986 | Tanaka | |
| 4,599,544 A | 7/1986 | Martin | |
| 4,630,904 A | 12/1986 | Pastore | |
| 4,638,287 A | 1/1987 | Umebayashi et al. | |
| 4,645,975 A | 2/1987 | Meitzler et al. | |
| 4,665,321 A | 5/1987 | Chang et al. | |
| 4,665,430 A | 5/1987 | Hiroyasu | |
| 4,692,798 A | 9/1987 | Seko et al. | |
| 4,716,298 A | 12/1987 | Etoh | |
| 4,727,290 A | 2/1988 | Smith et al. | |
| 4,740,838 A | 4/1988 | Mase et al. | |
| 4,768,135 A | 8/1988 | Kretschmer et al. | |
| 4,862,037 A | 8/1989 | Farber et al. | |
| 4,891,559 A | 1/1990 | Matsumoto et al. | |
| 4,902,108 A | 2/1990 | Byker | |
| 4,910,591 A | 3/1990 | Petrossian et al. | |
| 4,930,742 A | 6/1990 | Schofield et al. | |
| 4,934,273 A | 6/1990 | Endriz | |
| 4,967,319 A | 10/1990 | Seko | |
| 5,005,213 A | 4/1991 | Hanson et al. | |
| 5,008,946 A | 4/1991 | Ando | |
| 5,027,200 A | 6/1991 | Petrossian et al. | |
| 5,036,437 A | 7/1991 | Macks | |
| 5,052,163 A | 10/1991 | Czekala | |
| 5,066,112 A | 11/1991 | Lynam et al. | |
| 5,069,535 A | 12/1991 | Baucke et al. | |
| 5,072,154 A | 12/1991 | Chen | |
| 5,073,012 A | 12/1991 | Lynam | |
| 5,076,673 A | 12/1991 | Lynam et al. | |
| 5,086,253 A | 2/1992 | Lawler | |
| 5,096,287 A | 3/1992 | Kakinami et al. | |
| 5,115,346 A | 5/1992 | Lynam | |
| 5,121,200 A | 6/1992 | Choi et al. | |
| 5,124,549 A | 6/1992 | Michaels et al. | |
| 5,128,799 A | 7/1992 | Byker | |
| 5,151,824 A | 9/1992 | O'Farrell | |
| 5,158,638 A | 10/1992 | Osanami et al. | |
| 5,166,681 A | 11/1992 | Bottesch et al. | |
| 5,182,502 A | 1/1993 | Slotkowski et al. | |
| 5,187,383 A | 2/1993 | Taccetta et al. | |
| 5,197,562 A | 3/1993 | Kakinami et al. | |
| 5,207,492 A * | 5/1993 | Roberts ............... | B60Q 1/2665 340/468 |
| 5,230,400 A | 7/1993 | Kakainami et al. | |
| 5,235,178 A | 8/1993 | Hegyi | |
| 5,243,417 A | 9/1993 | Pollard | |
| 5,253,109 A | 10/1993 | O'Farrell et al. | |
| 5,278,693 A | 1/1994 | Theiste | |
| 5,280,380 A | 1/1994 | Byker | |
| 5,282,077 A | 1/1994 | Byker | |
| 5,289,321 A | 2/1994 | Secor | |
| 5,294,376 A | 3/1994 | Byker | |
| 5,296,924 A | 3/1994 | Blancard et al. | |
| D346,356 S | 4/1994 | Leu | |
| 5,304,980 A | 4/1994 | Maekawa | |
| 5,329,206 A | 7/1994 | Slotkowski et al. | |
| 5,336,448 A | 8/1994 | Byker | |
| 5,347,261 A | 9/1994 | Adell | |
| 5,347,459 A | 9/1994 | Greenspan et al. | |
| 5,355,146 A | 10/1994 | Chiu et al. | |
| 5,379,104 A | 1/1995 | Takao | |
| 5,379,146 A | 1/1995 | Defendini | |
| 5,381,309 A | 1/1995 | Borchardt | |
| 5,386,285 A | 1/1995 | Asayama | |
| 5,396,054 A | 3/1995 | Krichever et al. | |
| 5,402,170 A | 3/1995 | Parulski et al. | |
| 5,408,357 A | 4/1995 | Beukema | |
| 5,414,461 A | 5/1995 | Kishi et al. | |
| 5,416,318 A | 5/1995 | Hegyi | |
| 5,418,610 A | 5/1995 | Fischer | |
| 5,421,940 A | 6/1995 | Cornils et al. | |
| 5,424,952 A | 6/1995 | Asayama | |
| 5,426,294 A | 6/1995 | Kobayashi et al. | |
| 5,428,464 A | 6/1995 | Silverbrook | |
| 5,430,450 A | 7/1995 | Holmes | |
| 5,434,407 A | 7/1995 | Bauer et al. | |
| 5,448,397 A | 9/1995 | Tonar | |
| 5,451,822 A | 9/1995 | Bechtel et al. | |
| 5,452,004 A | 9/1995 | Roberts | |
| 5,469,298 A | 11/1995 | Suman et al. | |
| 5,471,515 A | 11/1995 | Fossum et al. | |
| 5,475,441 A | 12/1995 | Parulski et al. | |
| 5,475,494 A | 12/1995 | Nishida et al. | |
| 5,481,268 A | 1/1996 | Higgins | |
| 5,483,346 A | 1/1996 | Butzer | |
| 5,483,453 A | 1/1996 | Uemura et al. | |
| 5,485,155 A | 1/1996 | Hibino | |
| 5,485,378 A | 1/1996 | Franke et al. | |
| 5,488,496 A | 1/1996 | Pine | |
| 5,508,592 A | 4/1996 | Lapatovich et al. | |
| 5,515,448 A | 5/1996 | Nishitani | |
| 5,523,811 A | 6/1996 | Wada et al. | |
| 5,530,421 A | 6/1996 | Marshall et al. | |
| 5,535,144 A | 7/1996 | Kise | |
| 5,537,003 A | 7/1996 | Bechtel et al. | |
| 5,541,590 A | 7/1996 | Nishio | |
| 5,541,724 A | 7/1996 | Hoashi | |
| 5,550,677 A | 8/1996 | Schofield et al. | |
| 5,554,912 A | 9/1996 | Thayer et al. | |
| 3,280,701 A | 10/1996 | Donnelly et al. | |
| 5,574,443 A | 11/1996 | Hsieh | |
| 5,574,463 A | 11/1996 | Shirai et al. | |
| 5,576,975 A | 11/1996 | Sasaki et al. | |
| 5,587,929 A | 12/1996 | League et al. | |
| 5,592,146 A | 1/1997 | Kover, Jr. et al. | |
| 5,602,542 A | 2/1997 | Windmann et al. | |
| 5,614,788 A | 3/1997 | Mullins et al. | |
| 5,615,023 A | 3/1997 | Yang | |
| 5,617,085 A | 4/1997 | Tsutsumi et al. | |

(56) References Cited

U.S. PATENT DOCUMENTS

| | | |
|---|---|---|
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,649,756 A | 7/1997 | Adams et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,679,283 A | 10/1997 | Tonar |
| 5,680,123 A | 10/1997 | Lee |
| 5,682,267 A | 10/1997 | Tonar |
| 5,684,473 A | 11/1997 | Hibino et al. |
| 5,689,370 A | 11/1997 | Tonar |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,742,026 A | 4/1998 | Dickinson |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,790,298 A | 8/1998 | Tonar |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,803,579 A | 9/1998 | Turnbull |
| 5,808,778 A | 9/1998 | Bauer et al. |
| 5,811,888 A | 9/1998 | Hsieh |
| 5,812,321 A | 9/1998 | Schierbeek et al. |
| 5,818,625 A | 10/1998 | Forgette et al. |
| 5,825,527 A | 10/1998 | Forgette et al. |
| D400,481 S | 11/1998 | Stephens et al. |
| D401,200 S | 11/1998 | Huang |
| 5,837,994 A | 11/1998 | Stam |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,888,431 A | 3/1999 | Tonar et al. |
| 5,896,119 A | 4/1999 | Evanicky et al. |
| 5,904,729 A | 5/1999 | Ruzicka |
| 5,905,457 A | 5/1999 | Rashid |
| D410,607 S | 6/1999 | Carter |
| 5,912,534 A | 6/1999 | Benedict |
| 5,923,027 A | 7/1999 | Stam |
| 5,923,457 A | 7/1999 | Byker et al. |
| 5,928,572 A | 7/1999 | Tonar et al. |
| 5,935,613 A | 8/1999 | Benham et al. |
| 5,940,011 A | 8/1999 | Agravante et al. |
| 5,940,201 A | 8/1999 | Ash et al. |
| 5,942,853 A | 8/1999 | Piscart |
| 5,949,331 A | 9/1999 | Schofield et al. |
| 5,956,012 A | 9/1999 | Turnbull et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel |
| 5,998,617 A | 12/1999 | Srinivasa |
| 6,002,511 A | 12/1999 | Varaprasad |
| 6,008,486 A | 12/1999 | Stam |
| 6,009,359 A | 12/1999 | El-Hakim et al. |
| 6,018,308 A | 1/2000 | Shirai |
| 6,020,987 A | 2/2000 | Baumann |
| 6,023,040 A | 2/2000 | Zahavi |
| 6,023,229 A | 2/2000 | Bugno et al. |
| 6,025,872 A | 2/2000 | Ozaki et al. |
| 6,037,471 A | 3/2000 | Srinivasa |
| 6,043,452 A | 3/2000 | Bestenlehrer |
| 6,046,766 A | 4/2000 | Sakata |
| 6,049,171 A | 4/2000 | Stam |
| 6,051,956 A | 4/2000 | Nakashimo |
| 6,060,989 A | 5/2000 | Gehlot |
| 6,061,002 A | 5/2000 | Weber et al. |
| 6,062,920 A | 5/2000 | Jordan |
| 6,064,508 A | 5/2000 | Forgette et al. |
| 6,064,509 A | 5/2000 | Tonar et al. |
| 6,067,111 A | 5/2000 | Hahn et al. |
| 6,068,380 A | 5/2000 | Lynn et al. |
| 6,072,391 A | 6/2000 | Suzuki et al. |
| 6,078,355 A | 6/2000 | Zengel |
| 6,084,700 A | 7/2000 | Knapp |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,111,683 A | 8/2000 | Cammenga |
| 6,111,684 A | 8/2000 | Forgette |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,166,848 A | 12/2000 | Cammenga et al. |
| 6,167,755 B1 | 1/2001 | Damson et al. |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,188,505 B1 | 2/2001 | Lomprey |
| 6,191,704 B1 | 2/2001 | Takenaga et al. |
| 6,193,378 B1 | 2/2001 | Tonar et al. |
| 6,193,912 B1 | 2/2001 | Theiste |
| 6,195,194 B1 | 2/2001 | Roberts et al. |
| 6,200,010 B1 | 3/2001 | Anders |
| 6,218,934 B1 | 4/2001 | Regan |
| 6,222,177 B1 | 4/2001 | Bechtel |
| 6,222,447 B1 | 4/2001 | Schofield et al. |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | Devries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,214 B1 | 6/2001 | Kashiwazaki |
| 6,249,369 B1 | 6/2001 | Theiste et al. |
| 6,250,766 B1 | 6/2001 | Strumolo et al. |
| 6,255,639 B1 | 7/2001 | Stam |
| 6,259,475 B1 | 7/2001 | Ramachandran et al. |
| 6,262,831 B1 | 7/2001 | Bauer |
| 6,262,832 B1 | 7/2001 | Lomprey |
| 6,265,968 B1 | 7/2001 | Betzitza et al. |
| 6,268,803 B1 | 7/2001 | Gunderson et al. |
| 6,268,950 B1 | 7/2001 | Ash |
| 6,269,308 B1 | 7/2001 | Kodaka et al. |
| 6,281,632 B1 | 8/2001 | Stam |
| 6,281,804 B1 | 8/2001 | Haller et al. |
| 6,289,332 B2 | 9/2001 | Menig et al. |

(56) References Cited

U.S. PATENT DOCUMENTS

| | | |
|---|---|---|
| 6,291,812 B1 | 9/2001 | Bechtel |
| 6,300,879 B1 | 10/2001 | Regan et al. |
| 6,304,173 B2 | 10/2001 | Pala et al. |
| 6,313,457 B1 | 11/2001 | Bauer |
| 6,313,892 B2 | 11/2001 | Gleckman |
| 6,317,057 B1 | 11/2001 | Lee |
| 6,317,248 B1 | 11/2001 | Agrawal et al. |
| 6,320,612 B1 | 11/2001 | Young |
| 6,324,295 B1 | 11/2001 | Avionique et al. |
| D451,869 S | 12/2001 | Knapp et al. |
| 6,329,925 B1 | 12/2001 | Skiver et al. |
| 6,330,511 B2 | 12/2001 | Ogura et al. |
| 6,335,548 B1 | 1/2002 | Roberts |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar |
| 6,357,883 B1 | 3/2002 | Strumolo et al. |
| 6,359,274 B1 | 3/2002 | Nixon |
| 6,363,326 B1 | 3/2002 | Scully |
| 6,369,701 B1 | 4/2002 | Yoshida et al. |
| 6,379,013 B1 | 4/2002 | Bechtel |
| 6,392,783 B1 | 5/2002 | Lomprey |
| 6,396,040 B1 | 5/2002 | Hill |
| 6,396,397 B1 | 5/2002 | Bos et al. |
| 6,402,328 B1 | 6/2002 | Bechtel |
| 6,403,942 B1 | 6/2002 | Stam |
| 6,407,468 B1 | 6/2002 | Levesque et al. |
| 6,407,847 B1 | 6/2002 | Poll et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,800 B1 | 7/2002 | Levesque |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,485 B1 | 7/2002 | Buljajewski |
| 6,428,172 B1 | 8/2002 | Hutzel et al. |
| 6,429,594 B1 | 8/2002 | Stam |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,441,943 B1 | 8/2002 | Roberts |
| 6,442,465 B2 | 8/2002 | Breed et al. |
| 6,443,585 B1 | 9/2002 | Saccomanno |
| 6,443,602 B1 | 9/2002 | Tanabe et al. |
| 6,447,128 B1 | 9/2002 | Lang et al. |
| 6,447,130 B2 | 9/2002 | Chu |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,465,963 B1 | 10/2002 | Turnbull |
| 6,466,701 B1 | 10/2002 | Ejiri et al. |
| 6,469,739 B1 | 10/2002 | Bechtel |
| 6,471,362 B1 | 10/2002 | Carter |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | Deline et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,504,142 B2 | 1/2003 | Nixon |
| 6,507,779 B2 | 1/2003 | Breed et al. |
| 6,512,624 B2 | 1/2003 | Tonar |
| 6,515,581 B1 | 2/2003 | Ho |
| 6,515,597 B1 | 2/2003 | Wada et al. |
| 6,520,667 B1 | 2/2003 | Mousseau |
| 6,521,916 B2 | 2/2003 | Roberts |
| 6,522,969 B2 | 2/2003 | Kannonji |
| 6,523,976 B1 | 2/2003 | Turnbull |
| D471,847 S | 3/2003 | Rumsey et al. |
| 6,535,126 B2 | 3/2003 | Lin et al. |
| 6,542,085 B1 | 4/2003 | Yang |
| 6,542,182 B1 | 4/2003 | Chutorash |
| 6,545,598 B1 | 4/2003 | De Villeroche |
| 6,545,794 B2 | 4/2003 | Ash |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takashashi |
| 6,587,573 B1 | 7/2003 | Stam |
| 6,591,192 B2 | 7/2003 | Okamura et al. |
| 6,594,583 B2 | 7/2003 | Ogura et al. |
| 6,594,614 B2 | 7/2003 | Studt et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,612,708 B2 | 9/2003 | Chu |
| 6,614,387 B1 | 9/2003 | Deadman |
| 6,614,579 B2 | 9/2003 | Roberts et al. |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,635,194 B2 | 10/2003 | Kloeppner |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,700,692 B2 | 3/2004 | Tonar |
| 6,717,610 B2 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,746,122 B2 | 6/2004 | Knox |
| D493,131 S | 7/2004 | Lawlor et al. |
| D493,394 S | 7/2004 | Lawlor et al. |
| 6,768,566 B2 | 7/2004 | Walker |
| 6,772,057 B2 | 8/2004 | Breed et al. |
| 6,774,988 B2 | 8/2004 | Stam |
| 6,781,738 B2 | 8/2004 | Kikuchi et al. |
| 6,816,145 B1 | 11/2004 | Evanicky |
| 6,816,297 B1 | 11/2004 | Tonar |
| D499,678 S | 12/2004 | Bradley |
| 6,846,098 B2 | 1/2005 | Bourdelais et al. |
| 6,847,487 B2 | 1/2005 | Burgner |
| 6,848,817 B2 | 2/2005 | Bos et al. |
| 6,853,413 B2 | 2/2005 | Larson |

(56) References Cited

U.S. PATENT DOCUMENTS

| | | |
|---|---|---|
| 6,861,809 B2 | 3/2005 | Stam |
| 6,870,656 B2 | 3/2005 | Tonar et al. |
| 6,902,284 B2 | 6/2005 | Hutzel et al. |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,934,080 B2 | 8/2005 | Saccomanno et al. |
| 6,946,978 B2 | 9/2005 | Schofield |
| 6,968,273 B2 | 11/2005 | Ockerse |
| 7,012,543 B2 | 3/2006 | Deline et al. |
| 7,038,577 B2 | 5/2006 | Pawlicki et al. |
| 7,042,616 B2 | 5/2006 | Tonar et al. |
| 7,046,448 B2 | 5/2006 | Burgner |
| 7,064,882 B2 | 6/2006 | Tonar |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| D553,061 S | 10/2007 | Schmidt et al. |
| 7,285,903 B2 | 10/2007 | Cull et al. |
| 7,287,868 B2 | 10/2007 | Carter |
| 7,292,208 B1 | 11/2007 | Park et al. |
| 7,311,428 B2 | 12/2007 | Deline et al. |
| 7,321,112 B2 | 1/2008 | Stam et al. |
| 7,324,261 B2 | 1/2008 | Tonar et al. |
| 7,342,707 B2 | 3/2008 | Roberts |
| 7,360,932 B2 | 4/2008 | Uken et al. |
| 7,417,221 B2 | 8/2008 | Creswick et al. |
| 7,417,717 B2 | 8/2008 | Pack |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,592,563 B2 | 9/2009 | Wissenbach |
| 7,619,508 B2 | 11/2009 | Lynam et al. |
| 7,653,215 B2 | 1/2010 | Stam |
| 7,658,521 B2 | 2/2010 | Deline et al. |
| 7,663,798 B2 | 2/2010 | Tonar |
| 7,683,326 B2 | 3/2010 | Stam et al. |
| 7,688,495 B2 | 3/2010 | Tonar et al. |
| 7,706,046 B2 | 4/2010 | Bauer et al. |
| 7,711,479 B2 | 5/2010 | Taylor et al. |
| 7,719,408 B2 | 5/2010 | Deward et al. |
| 7,720,580 B2 | 5/2010 | Higgins-Luthman |
| 7,746,534 B2 | 6/2010 | Tonar et al. |
| 7,815,326 B2 | 10/2010 | Blank et al. |
| 7,817,020 B2 | 10/2010 | Turnbull et al. |
| 7,821,696 B2 | 10/2010 | Tonar et al. |
| 7,830,583 B2 | 11/2010 | Neuman et al. |
| 7,864,399 B2 | 1/2011 | Mccabe et al. |
| 7,877,175 B2 | 1/2011 | Higgins-Luthman |
| 7,881,496 B2 | 2/2011 | Camilleri et al. |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,978,393 B2 | 7/2011 | Tonar et al. |
| 7,994,471 B2 | 8/2011 | Heslin et al. |
| 8,031,225 B2 | 10/2011 | Watanabe et al. |
| 8,035,881 B2 | 10/2011 | Luten et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,095,310 B2 | 1/2012 | Taylor et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,194,133 B2 | 6/2012 | DeWind et al. |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,482,683 B2 | 7/2013 | Hwang et al. |
| 8,520,069 B2 | 8/2013 | Haler |
| 8,559,092 B2 | 10/2013 | Bugno et al. |
| 8,564,662 B2 | 10/2013 | Busch et al. |
| 8,779,910 B2 | 7/2014 | DeLine et al. |
| 9,134,585 B2 | 9/2015 | Tonar et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | Mcmahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |

(56) References Cited

U.S. PATENT DOCUMENTS

| | | |
|---|---|---|
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0099693 A1 | 5/2005 | Schofield et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0146481 A1 | 6/2007 | Chen et al. |
| 2007/0171037 A1 | 7/2007 | Schofield et al. |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2008/0302657 A1 | 12/2008 | Luten et al. |
| 2009/0015736 A1 | 1/2009 | Weller et al. |
| 2009/0141516 A1 | 6/2009 | Wu et al. |
| 2009/0296190 A1 | 12/2009 | Anderson et al. |
| 2010/0110553 A1 | 5/2010 | Anderson et al. |
| 2010/0201896 A1 | 8/2010 | Ostreko et al. |
| 2010/0277786 A1 | 11/2010 | Anderson et al. |
| 2010/0289995 A1 | 11/2010 | Hwang et al. |
| 2011/0168687 A1 | 7/2011 | Door |
| 2011/0176323 A1 | 7/2011 | Skiver et al. |
| 2011/0181727 A1 | 7/2011 | Weller et al. |
| 2011/0317015 A1 | 12/2011 | Seto et al. |
| 2012/0038964 A1 | 2/2012 | De Wind et al. |
| 2012/0069444 A1 | 3/2012 | Campbell et al. |
| 2012/0229882 A1 | 9/2012 | Fish, Jr. et al. |
| 2012/0236388 A1 | 9/2012 | De Wind et al. |
| 2013/0028473 A1 | 1/2013 | Hilldore et al. |
| 2013/0170013 A1 | 7/2013 | Tonar et al. |
| 2013/0279014 A1 | 10/2013 | Fish, Jr. et al. |
| 2014/0022390 A1 | 1/2014 | Blank et al. |
| 2014/0043479 A1 | 2/2014 | Busch et al. |
| 2014/0192431 A1 | 7/2014 | Sloterbeek et al. |
| 2014/0347488 A1 | 11/2014 | Tazaki et al. |
| 2016/0137133 A1* | 5/2016 | VanderPloeg ......... B60R 1/1207 359/275 |

FOREIGN PATENT DOCUMENTS

| | | |
|---|---|---|
| EP | 0667254 B1 | 10/1997 |
| EP | 0899157 A1 | 3/1999 |
| EP | 0744231 B1 | 11/2001 |
| EP | 0899157 B1 | 10/2004 |
| EP | 2845921 A2 | 3/2015 |
| GB | 2338363 | 12/1999 |
| JP | 1178693 | 3/1999 |
| JP | 3070845 U | 8/2000 |
| JP | 2002096685 A | 4/2002 |
| JP | 2002120649 A | 4/2002 |
| JP | 2002200936 A | 7/2002 |
| JP | 2005148119 | 6/2005 |
| JP | 2005327600 | 11/2005 |
| JP | 2008139819 A | 6/2008 |
| JP | 2009542505 A | 12/2009 |
| JP | 2013244753 | 12/2013 |
| KR | 20100123433 A | 11/2010 |
| WO | 9621581 | 7/1996 |
| WO | 2007006104 A1 | 1/2007 |
| WO | 2007103573 A2 | 9/2007 |
| WO | 2010090964 | 8/2010 |
| WO | 2011044312 A1 | 4/2011 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

International Searching Authority, International Search Report and Written Opinion for International Application No. PCT/US2013/037080, dated Aug. 29, 2013, 6 pages.

Japanese Patent Office, Official Action for Japanese Application No. 2015-509030, dated Jan. 18, 2016, 15 pages.

State Intellectual Property Office of the People's Republic of China, Notification of the First Office Action for Chinese Application No. 201380028888.3, dated Apr. 6, 2016, 15 pages.

International Searching Authority, International Search Report and Written Opinion for International Application No. PCT/US2016/032905, dated Sep. 1, 2016 (8 pages).

* cited by examiner

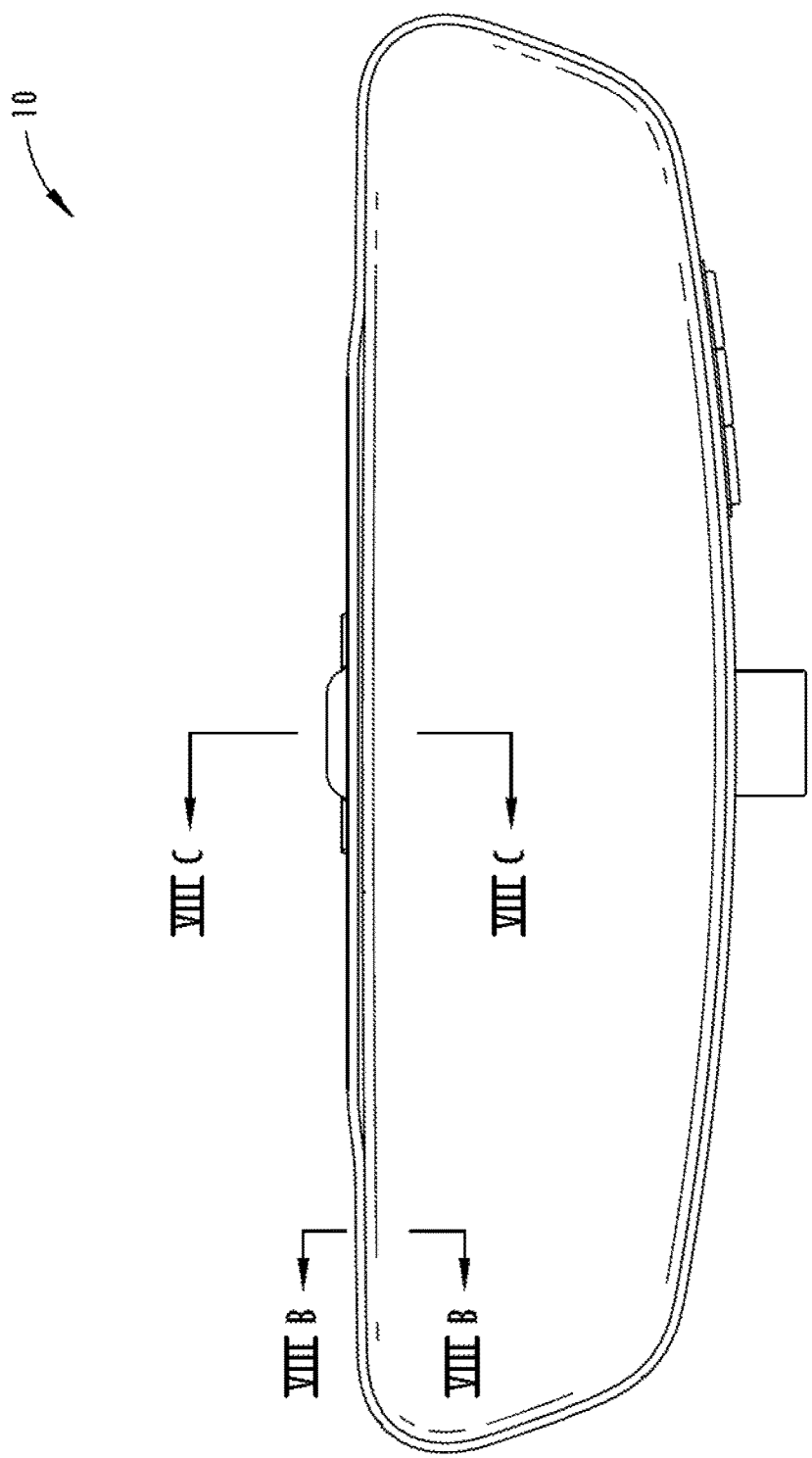

FULL DISPLAY REARVIEW DEVICE

CROSS-REFERENCE TO RELATED APPLICATION

This application claims priority to and the benefit under 37 U.S.C. § 119(e) of U.S. Provisional Application No. 62/163,226, filed on May 18, 2015, entitled "REARVIEW DEVICE," the disclosure of which is hereby incorporated herein by reference in its entirety.

BACKGROUND OF THE DISCLOSURE

The present disclosure generally relates to a rearview device system, and more particularly, to a full display rearview device having a partially reflective, partially transmissive element and a display behind the reflective element.

SUMMARY OF THE DISCLOSURE

One aspect of the disclosure includes a display mirror assembly having a mount operably coupled to a vehicle interior. The mount includes one of a ball and a socket extending forwardly therefrom. An engagement plate is pivotally coupled with the mount via the other of a ball and a socket extending rearwardly from the engagement plate. The engagement plate includes a first support member and a second support member pivotally coupled to the first support member. A carrier plate is operably coupled with the engagement plate. The carrier plate supports a rear housing on a rear portion thereof. A glass element is operably coupled with the carrier plate. A display module is configured to be turned to an on state and an off state. An actuator device is disposed on a bottom surface of the housing and is operably coupled with the glass element. The actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

Another aspect of the disclosure includes a display mirror assembly having a mount operably coupled to a vehicle interior. The mount includes one of a ball and a socket extending forwardly therefrom. A carrier plate is operably coupled with an engagement plate. The carrier plate supports a rear housing on a rear portion thereof. A glass element is operably coupled with the carrier plate. An optic stack is disposed behind the glass element. A glare sensor is operably coupled with the glass element and is in optical communication with a light pipe that is exposed to an exterior of the display mirror assembly. A display module is configured to be turned to an on state and an off state. An actuator device is disposed on a bottom surface of the housing and is operably coupled with the glass element. The actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

Still another aspect of the disclosure includes a display mirror assembly having a mount operably coupled to a vehicle interior. The mount includes one of a ball and a socket extending forwardly therefrom. A carrier plate is operably coupled with an engagement plate. The carrier plate supports a rear housing on a rear portion thereof. A glass element is operably coupled with the carrier plate. A glare sensor is operably coupled with the carrier plate and is in optical communication with a light pipe that is exposed to an exterior of the display mirror assembly. A display module is configured to be turned to an on state and an off state. An actuator device is disposed on a bottom surface of the housing and is operably coupled with the glass element. The actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

Yet another aspect of the disclosure includes a display mirror assembly that is configured to provide an image via a liquid crystal display (LCD) of a scene rearward of a vehicle. During certain instances, as determined by a driver, the LCD can be deactivated by toggling an actuator device between forward and rearward positions. Even after the deactivation of the LCD, a rearward view of a vehicle can be seen by reflective member disposed inside the display mirror assembly. The display mirror assembly, as set forth herein, provides a multi-functional device that can be adjusted based on user preferences, which is easy to manufacture, and which is very robust.

These and other features, advantages, and objects of the present disclosure will be further understood and appreciated by those skilled in the art by reference to the following specification, claims, and appended drawings.

BRIEF DESCRIPTION OF THE DRAWINGS

FIG. 16 is a front elevational view of a display mirror assembly of the present disclosure illustrating the distance from the active area to the edge of the glass element.

DETAILED DESCRIPTION

Figure 1:
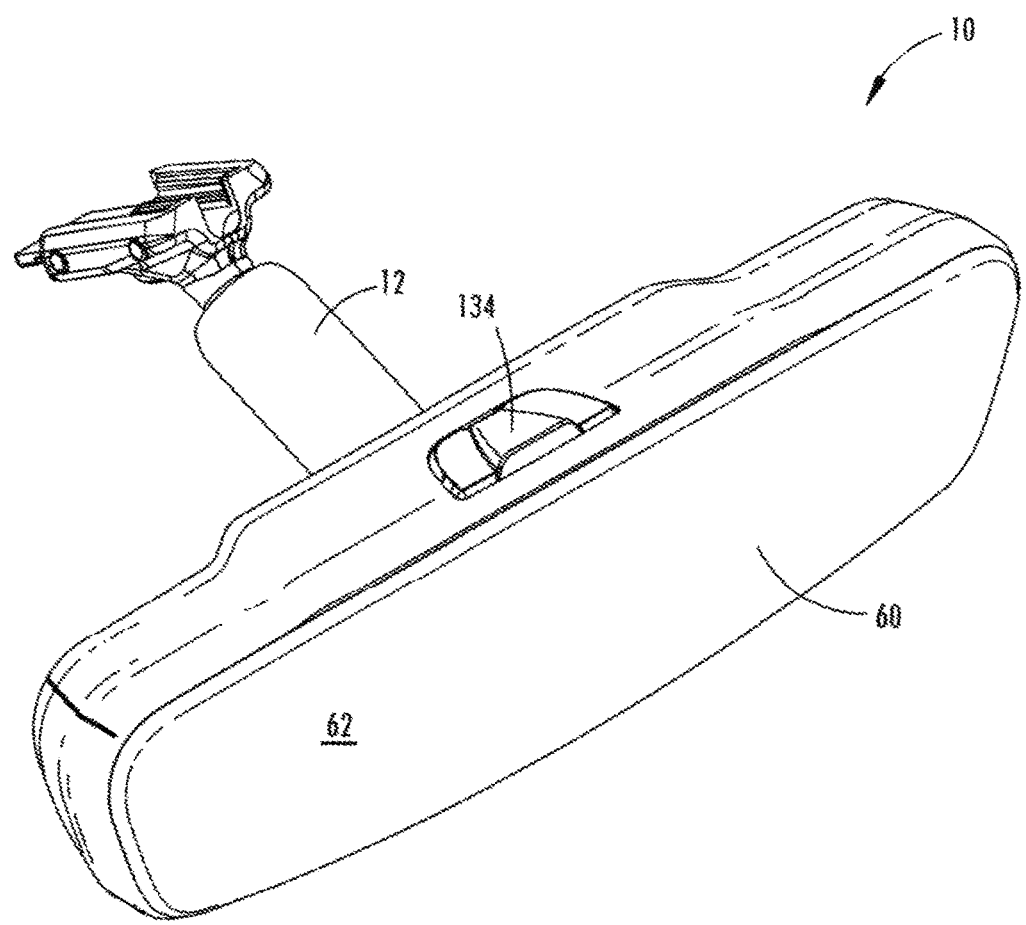
FIG. 1 is a top perspective view of one embodiment of a display mirror assembly of the present disclosure.
Figure 2:
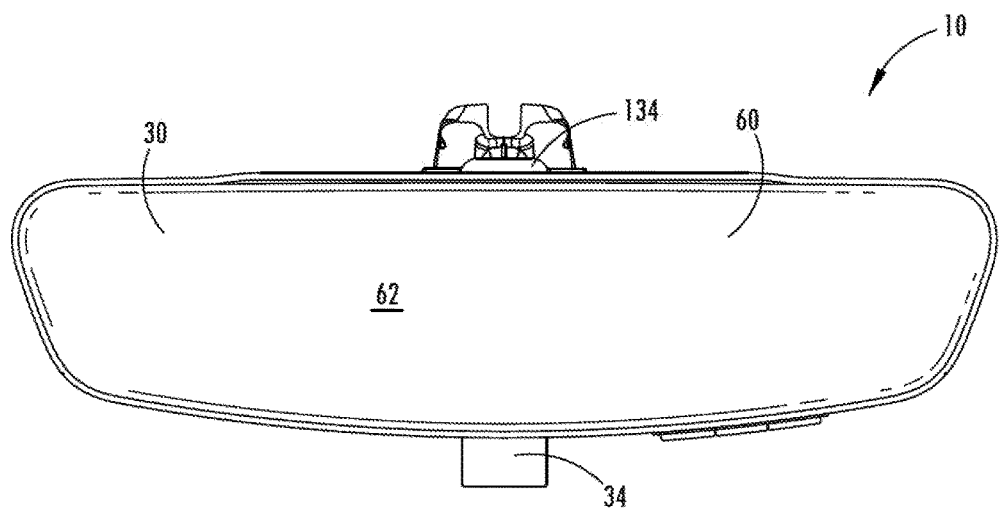
FIG. 2 is a front elevational view of the display mirror assembly of FIG. 1.
Figure 3:
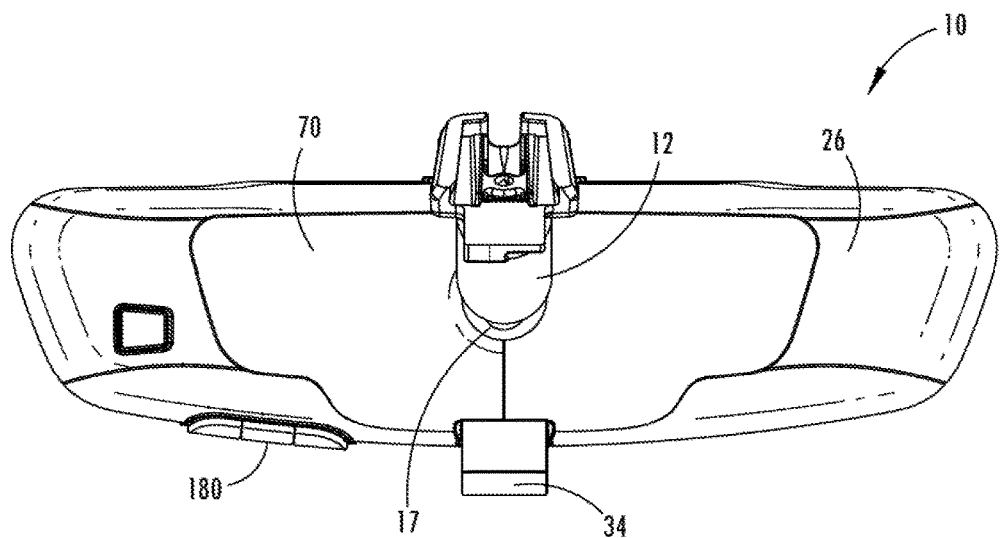
FIG. 3 is a rear elevational view of the display mirror assembly of FIG. 1.
Figure 4:
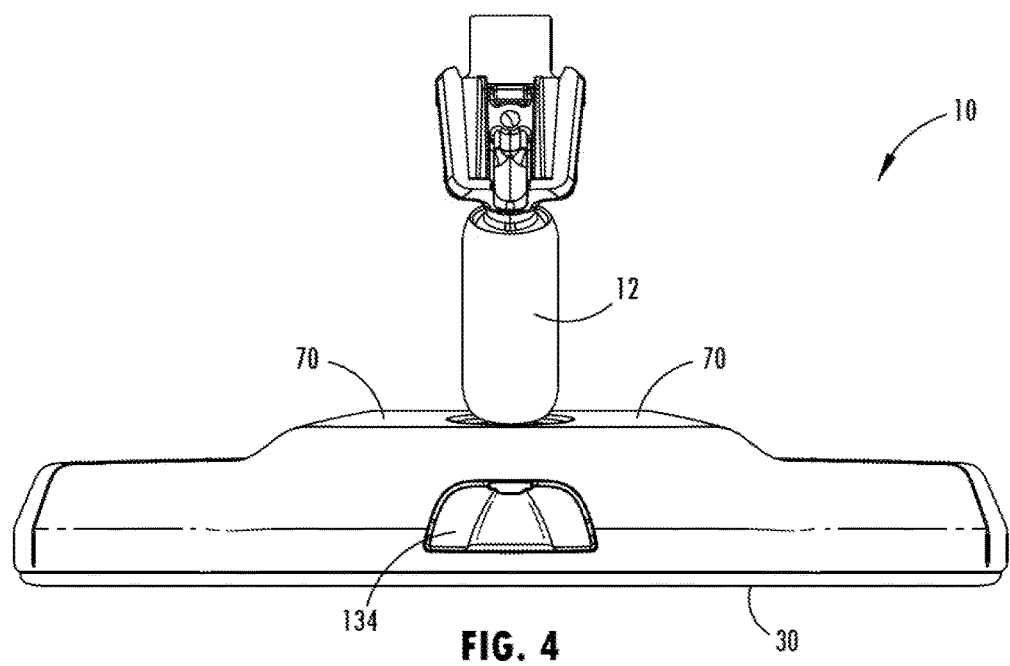
FIG. 4 is a top plan view of the display mirror assembly of FIG. 1.
Figure 5:
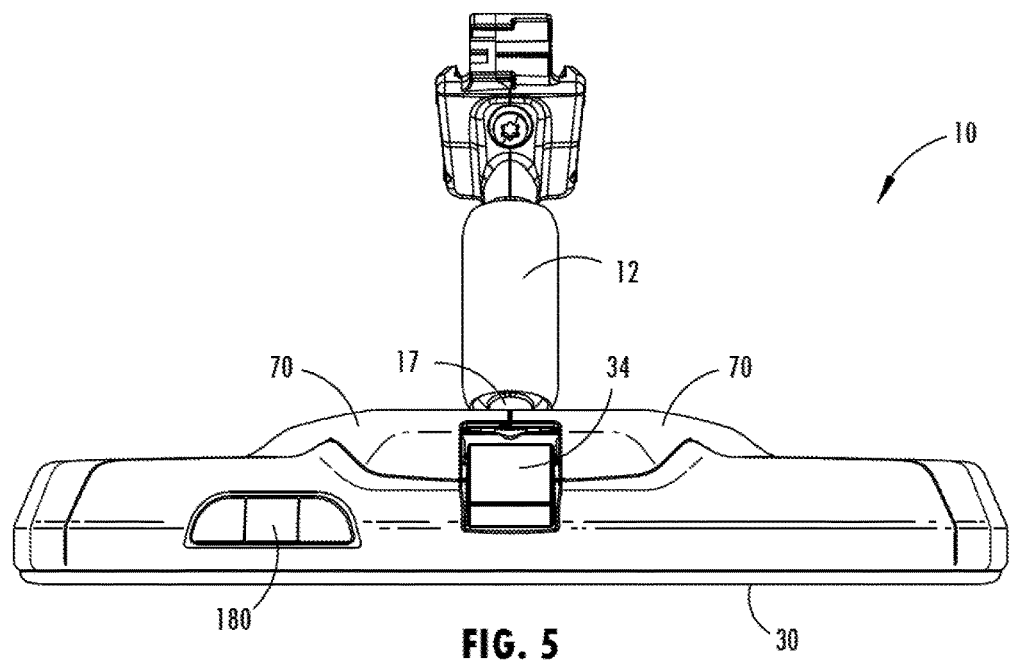
FIG. 5 is a bottom plan view of the display mirror assembly of FIG. 1.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-16, reference numeral 10 generally designates a display mirror assembly having a mount 12 operably coupled to a vehicle interior. The mount 12 includes one of a ball and a socket 14 extending forwardly therefrom. An engagement plate 16 is pivotally coupled with the mount 12 via a mounting member 17 having the other of a ball and a socket 14 extending rearwardly from the engagement plate 16. The engagement plate 16 includes a first support member 20 and a second support member 22 pivotally coupled to the first support member 20. A carrier plate 24 is operably coupled with the engagement plate 16. The carrier plate 24 supports a rear housing 26 on a rear portion 28 thereof. A glass element 30 is operably coupled with the carrier plate 24. A display module 32 is configured to be turned to an on state and an off state. An actuator device 34 is disposed on a bottom surface of the rear housing 26 and is operably coupled with the glass element 30. The actuator device 34 is adjustable to tilt the glass element 30 in one direction, thereby moving the glass element 30 to an off-axis position which approximately simultaneously changes the on/off state of the display module 32, and wherein the actuator device 34 is also adjustable to tilt the glass element 30 in another direction, thereby moving the glass element 30 to an on-axis position which approximately simultaneously changes the on/off state of the display module 32.

As referenced above, the reference numeral 10 generally designates a rearview device in the form of a display mirror assembly for a vehicle. The display mirror assembly 10 includes the partially reflective, partially transmissive element 30 (also referred to as a "glass element" herein). The display module 32 is viewable through the partially reflective, partially transmissive element 30. The display mirror assembly 10 further includes a front shield 40 and a carrier plate 24, which shield and support the partially reflective, partially transmissive element 30 and the display module 32. The display module 32 generally includes several components, including a display 44, an optic stack 46, an optic tray 48, a main printed circuit board (PCB) 50, and a heat sink 52. The rear housing 26 at least partially receives the front shield 40, the display module 32, and the carrier plate 24. The rear housing 26 covers a rear portion of the carrier plate 24, but does not structurally support the display mirror assembly 10. The carrier plate 24, however, supports the entire rearview device 10 via a mounting member 17 extending rearwardly therefrom. The mounting member 17 is adapted for connection with the mount 12 coupled to a windshield of a vehicle.

Referring generally to FIG. 1, the display mirror assembly 10 has a viewing area 60, which includes a front surface 62 of the glass element 30. The viewing area 60 may be a rectangular shape, a trapezoidal shape, or any custom contoured shape desired for aesthetic reasons.

Figure 6:
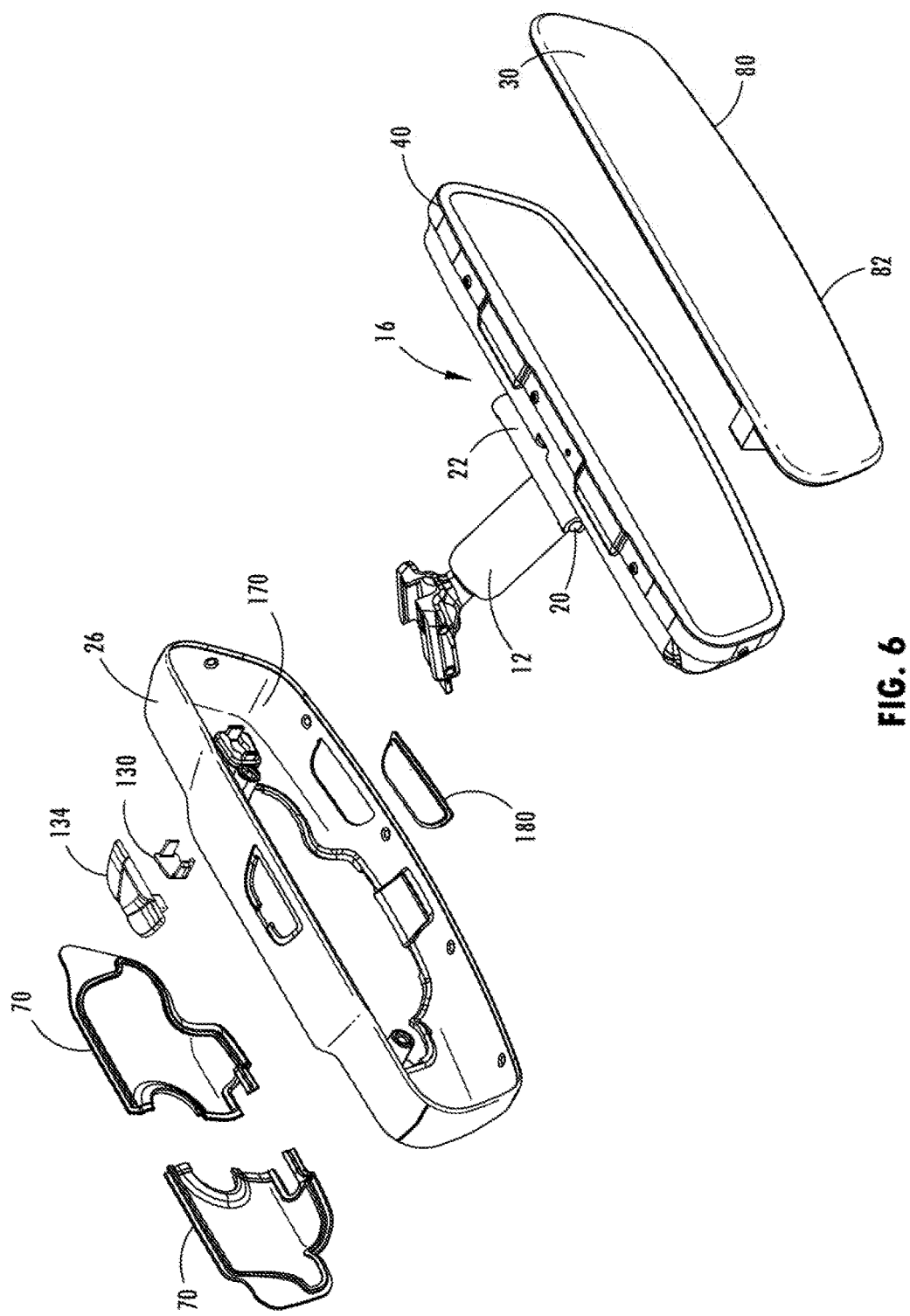
FIG. 6 is a front perspective partially exploded view of the display mirror assembly of FIG. 1.
Figure 6A:
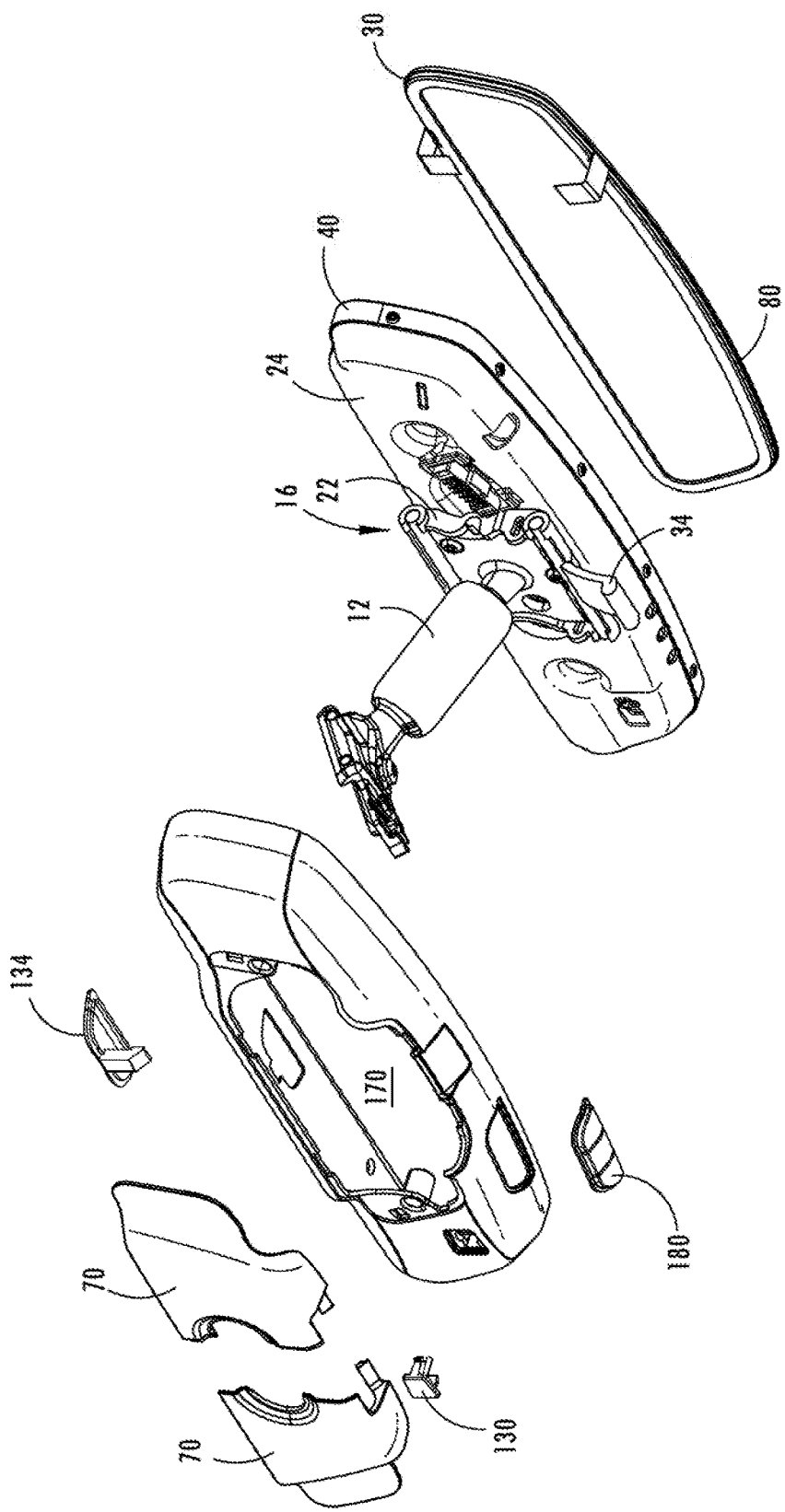
FIG. 6A is a rear perspective partially exploded view of the display mirror assembly of FIG. 1.
Figure 7:
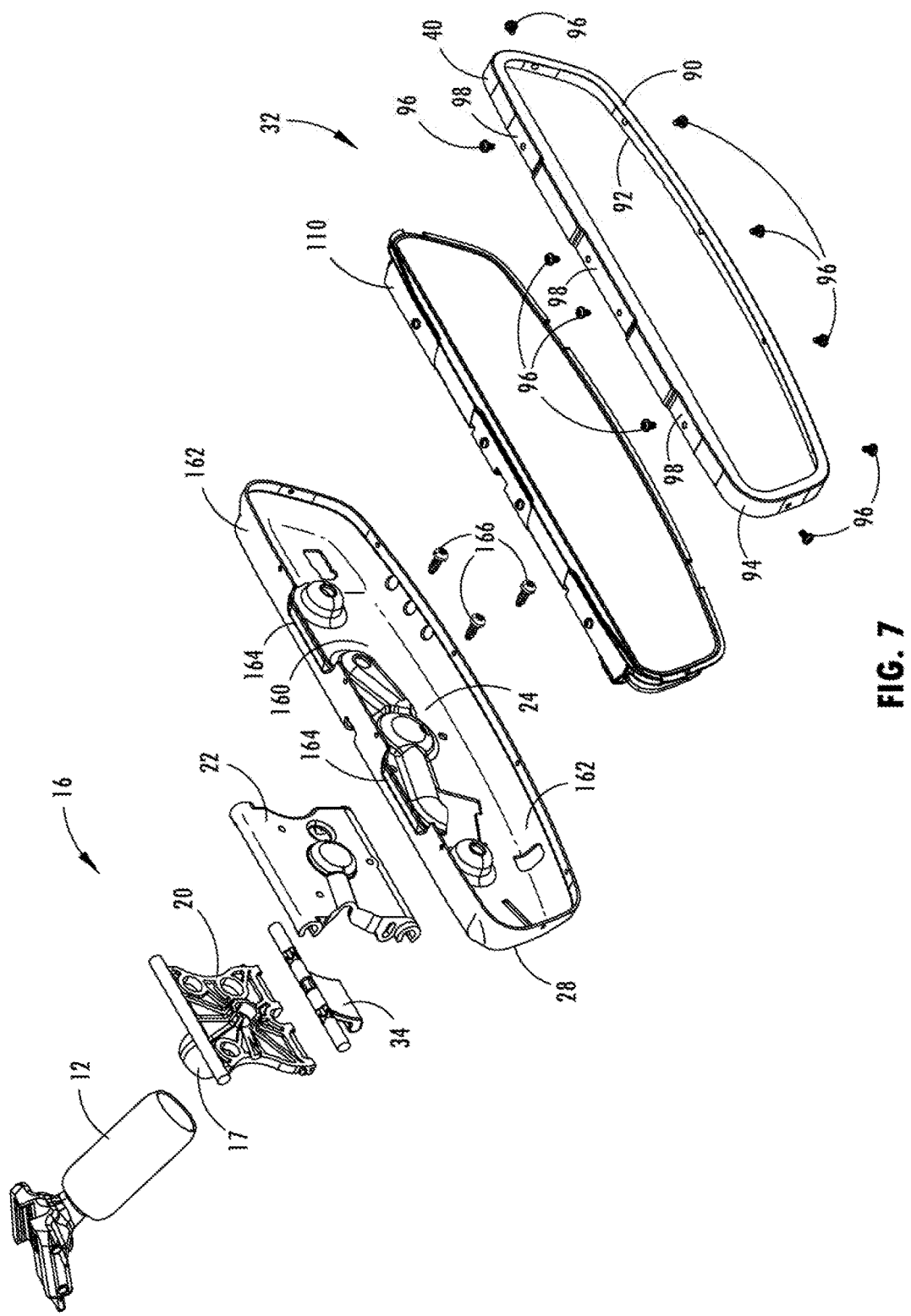
FIG. 7 is a front perspective exploded view of internal components of the display mirror assembly of FIG. 1.
Figure 7A:
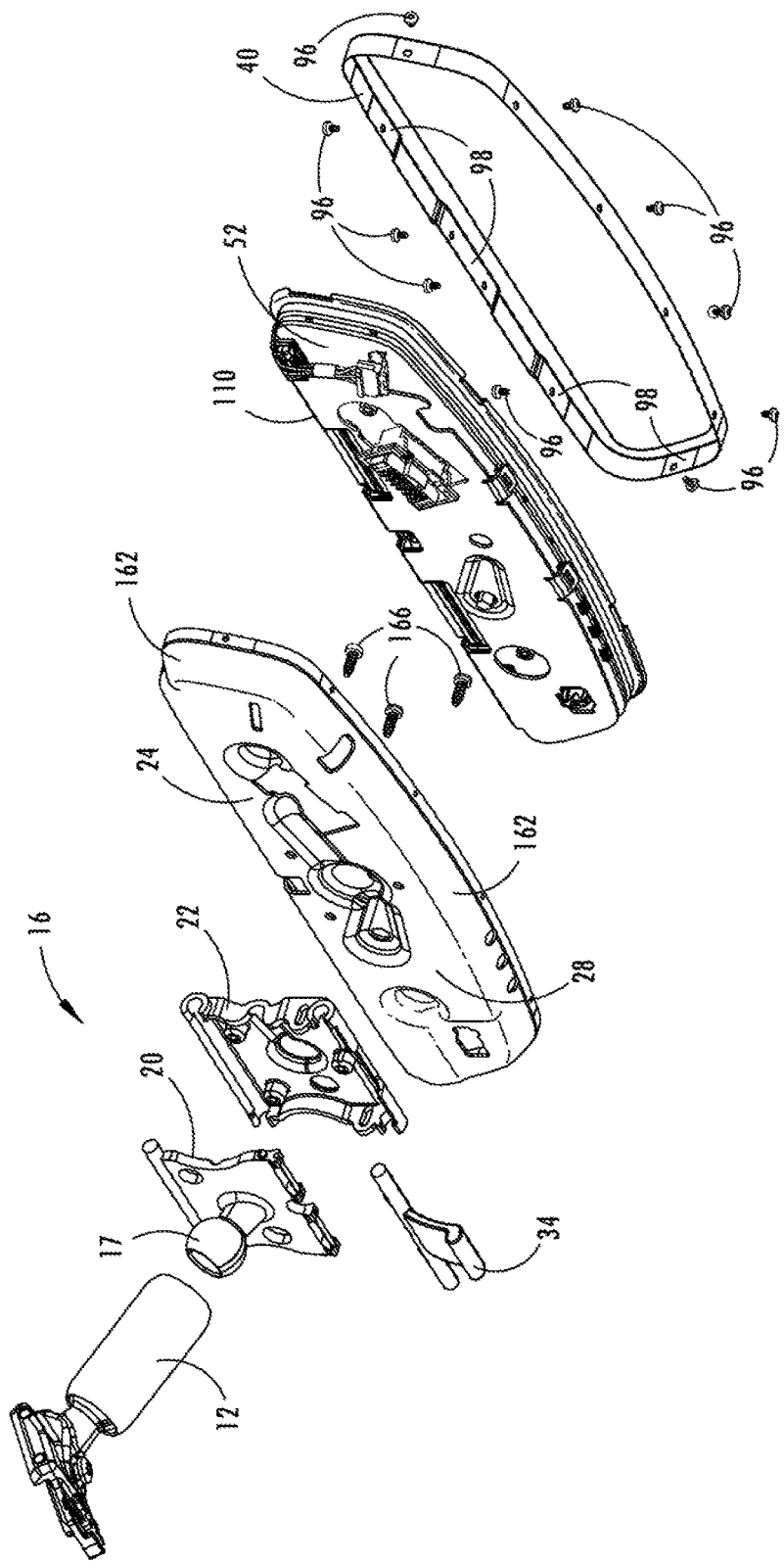
FIG. 7A is a rear perspective exploded view of internal components of the display mirror assembly of FIG. 1.

Referring to FIGS. 6 and 6A, the display mirror assembly 10 for a vehicle is shown, with the internal components partially exploded. The display mirror assembly 10 includes the glass element 30, the front shield 40, and the carrier plate 24 encapsulating the display module 32, the rear housing 26, rear coverplates 70, and the mounting member 17. As shown in FIGS. 7 and 7A, the front shield 40, the carrier plate 24, and components of the display module 32 include various retaining features to operably connect the several components of the display module 32 with the front shield 40, the carrier plate 24, and each other, and to provide support to the display module 32. Specifically, the front shield 40 includes retaining features to operably couple the front shield 40 to the display module 32, and the carrier plate 24 has retaining features to operably couple the carrier plate 24 to the display module 32. The retaining features generally include snap fit connections, tab and slot connections, screw connections, and other known retaining features. Some or all of the retaining features may also be strengthened by the addition of adhesive compounds. Certain non-limiting illustrative examples of retaining features are described in detail herein.

The display mirror assembly 10 will hereafter be described in greater detail, beginning with the elements closest to the intended viewer, and extending rearwardly away from the viewer.

As shown in FIGS. 1-4, 6, and 6A, the glass element 30 is generally planar, with an outer perimeter 80 and a border 82 around the outer perimeter 80. The border 82 may incorporate an edge treatment, such as a chrome ring, or other similar finish, to conceal the front shield 40 and other elements located behind the glass element 30 in the display mirror assembly 10, including, without limitation, a seal on an electro-optic unit, an applique, foam adhesive, or pad printing. The border 82 may extend from the outer perimeter 80 of the glass element 30 to an outer edge of the display 44. Alternatively, the border 82 may be narrower and not reach from the outer perimeter 80 to the outer edge of the display 44 along at least some portions of the border 82. The outer perimeter 80 of the glass element 30 may also have a ground edge, a bezeled edge, or be frameless.

The glass element 30 may be an electro-optic element or an element such as a prism. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. Nos. 5,928,572 entitled "Electrochromic Layer And Devices Comprising Same," 5,998,617 entitled "Electrochromic Compounds," 6,020,987 entitled "Electrochromic Medium Capable Of Producing A Pre-selected Color," 6,037,471 entitled "Electrochromic Compounds," 6,141,137 entitled "Electrochromic Media For Producing A Pre-selected Color," 6,241,916 entitled "Electrochromic System," 6,193,912 entitled "Near Infrared-Absorbing Electrochromic Compounds And Devices Comprising Same," 6,249,369 entitled "Coupled Electrochromic Compounds With Photostable Dication Oxidation States," and 6,519,620 entitled "Electrochromic Media With Concentration Enhanced Stability, Process For The Preparation Thereof and Use In Electrochromic Devices"; 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. The glass element may also be any other element having partially reflective, partially transmissive properties. To provide electric current to the glass element 30, electrical elements are provided on opposing sides of the element, to generate an electrical potential therebetween. Element clips 89, such as J-clips, are electrically engaged with each electrical element, and element wires extend from the J-clips to the main PCB.

Now referring to FIGS. 7 and 7A, the front shield 40 functions to shield the display module 32 from radio frequency (RF) electromagnetic radiation and to provide support for the glass element 30 and the display module 32. The front shield 40 is formed from one or more materials which are suitable to block RF radiation, including without limitation steel. As a non-limiting example, the front shield 40 can be formed from a stamped steel material.

Referring again to FIGS. 7 and 7A, the front shield 40 is generally shaped in the form of a ring having an opening therethrough. The front shield 40 has a front side 90, a rear side 92, and an outer surface 94, which is generally coextensive with the outer perimeter 80 of the glass element 30. The front shield 40 includes retaining features 96 extending therefrom, to mechanically engage the glass element 30. An adhesive, such as a foam adhesive, may also be used to secure the glass element 30 to the front shield 40. The front shield 40 further includes tabs 98 to operably engage the carrier plate 24 (or a component of the display module). The tabs 98 further include holes therethrough, to operably engage at least one component of the display module 32, such as the optic stack 46.

Figure 8:
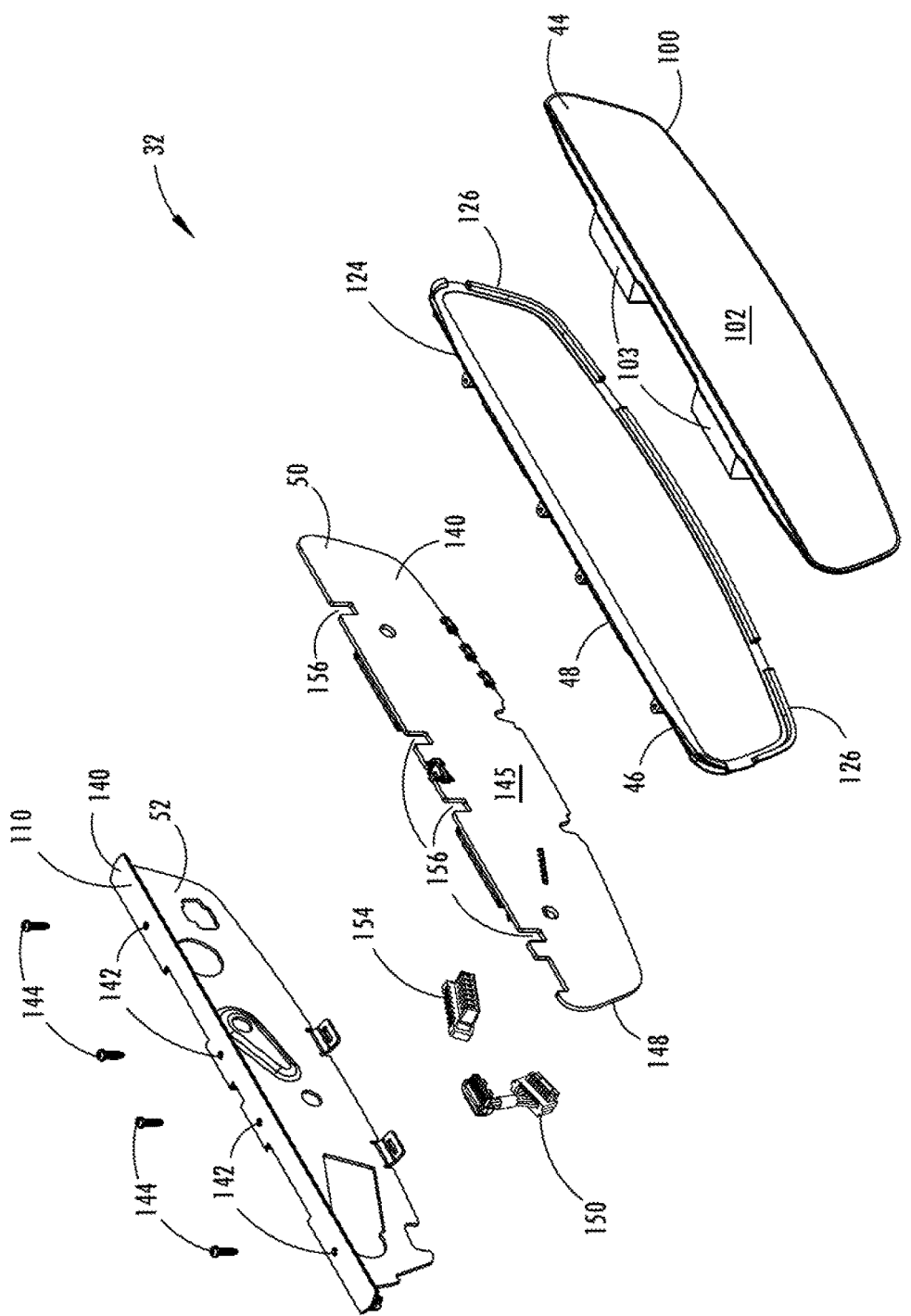
FIG. 8 is a front perspective partial exploded view of internal components the display mirror assembly of FIG. 1.
Figure 8A:
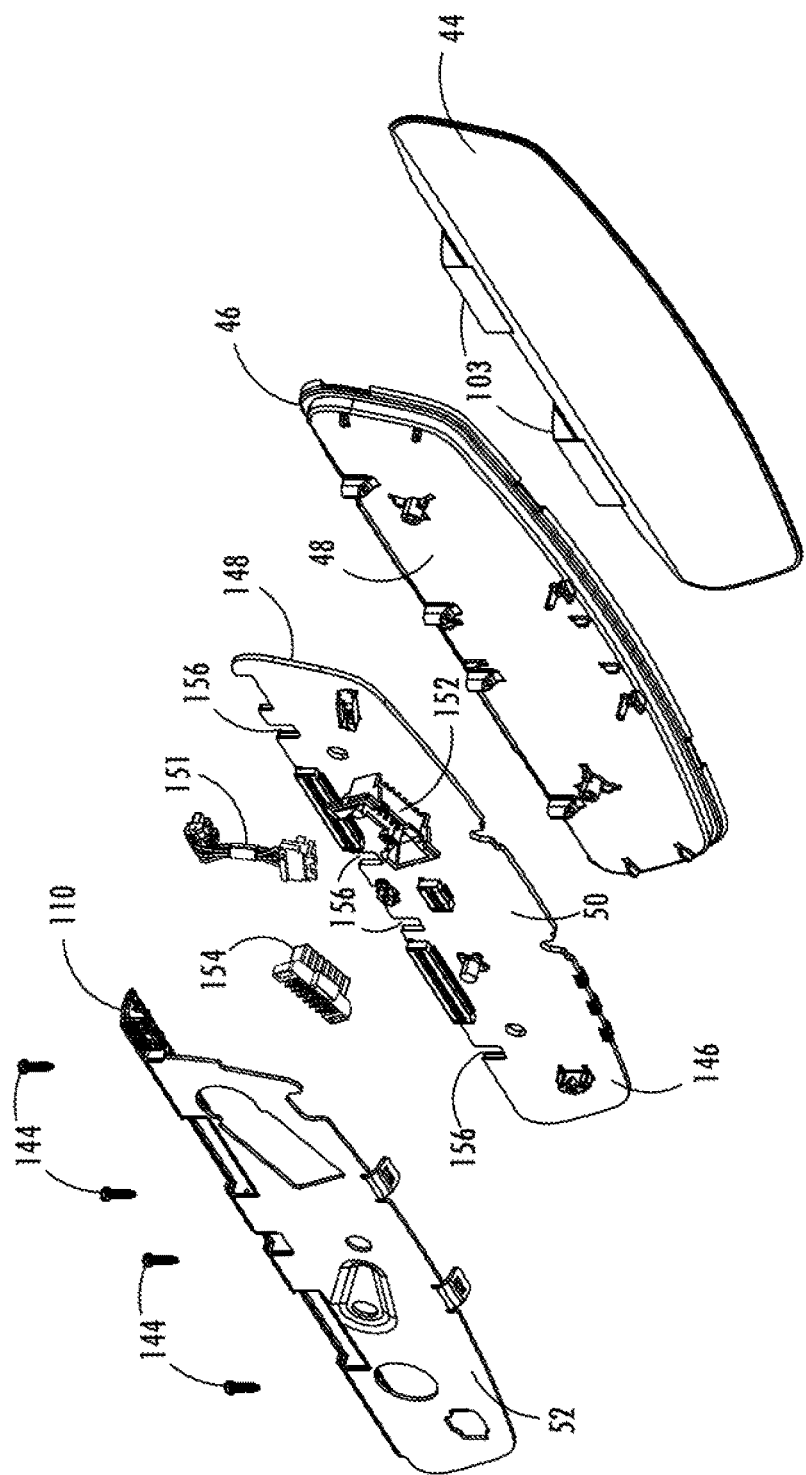
FIG. 8A is a rear perspective partial exploded view of internal components the display mirror assembly of FIG. 1.

As best shown in FIGS. 8 and 8A, the display module 32 is disposed behind the front shield 40, with the display 44 viewable through the opening in the front shield 40. The components of the display module 32 are ordered, from the front shield 40 toward the carrier plate 24, the display 44, the optic stack 46, the optic tray 48, the main PCB 50, and the heat sink 52.

The display 44 is generally planar, with an outer edge 100 defining a front surface 102. The front surface 102 of the display 44 can be shaped to correspond to and fit within the shape of the viewing area 60 of the display mirror assembly 10. Alternatively, the display 44 may have a front surface 102 which fits within, but is not complementary to the viewing area 60, for example, where the front surface 102 of the display 44 is generally rectangular and the front surface 62 of the glass element 30 has a contoured outer perimeter. The distance between the outer edge 100 of the display 44 and the outer perimeter 80 of the glass element 30 is about 9 mm or less along at least a portion of the outer edge 100. In one embodiment, the display 44 has a viewable front surface area which is about 56% to about 70% of the viewing area 60 of the glass element 30. The display 44 includes tabs 103 that engage the carrier plate 24.

The display 44 may be a liquid crystal display (LCD), a light-emitting diode (LED), an organic light-emitting diode (OLED), plasma, digital light processing (DLP), or other display technology. The display 44 is operably coupled with a secondary PCB 110, which is operably mechanically and electrically connected with the main PCB 50 via a flexible electrical connector. The flexible electrical connector has a length sufficient to extend over the components of the display module 32 between the display 44 and the main PCB 50, and at least a portion of the heat sink 52. The secondary PCB 110 also has a width which extends substantially along a top edge of the display 44. The secondary PCB 110, when operably coupled to the main PCB 50, aids in securing the components along a top edge of the display module 32.

Figure 8B:
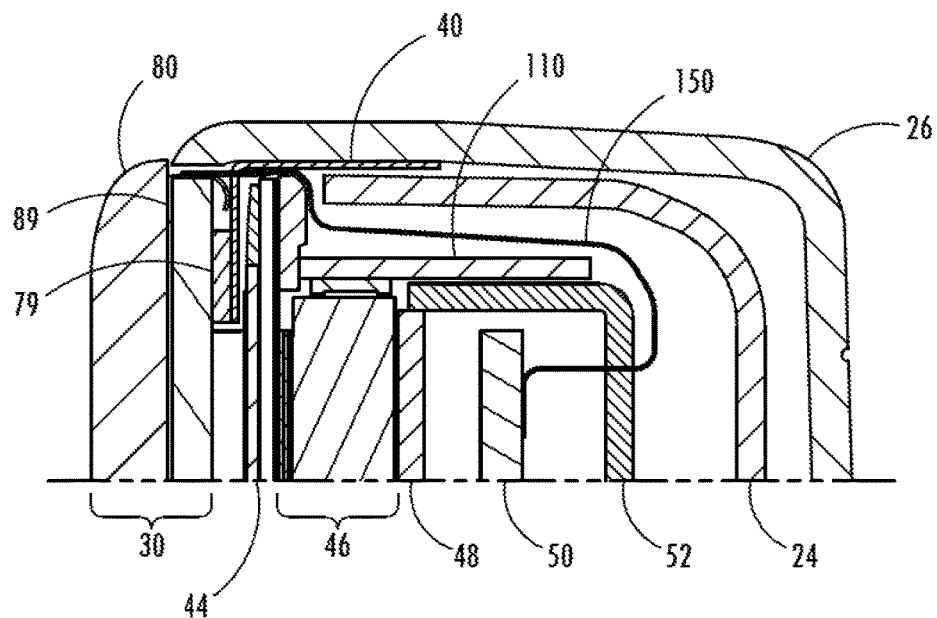
FIG. 8B is an enlarged partial cross-sectional view of the display mirror assembly of FIG. 1.
Figure 8C:
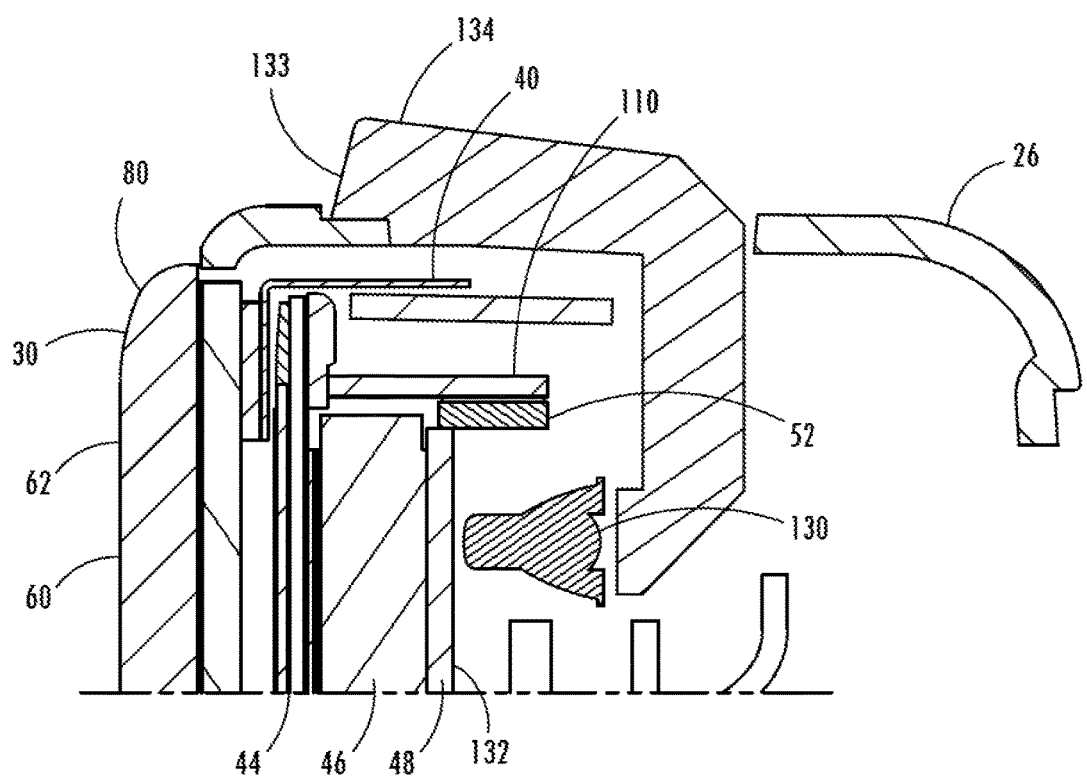
FIG. 8C is an enlarged partial cross-sectional view of the display mirror assembly of FIG. 1 taken at the glare sensor.
Figure 9:
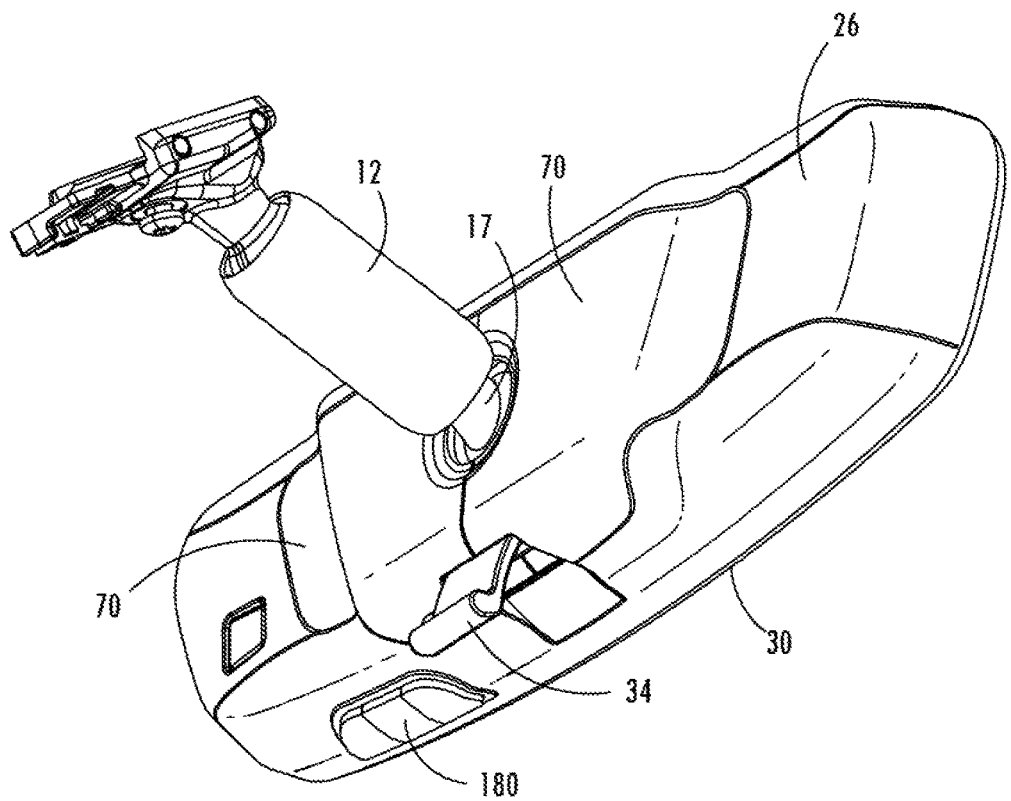
FIG. 9 is a bottom perspective view of the display mirror assembly of the present disclosure with an actuator device in a rearward position.
Figure 10:
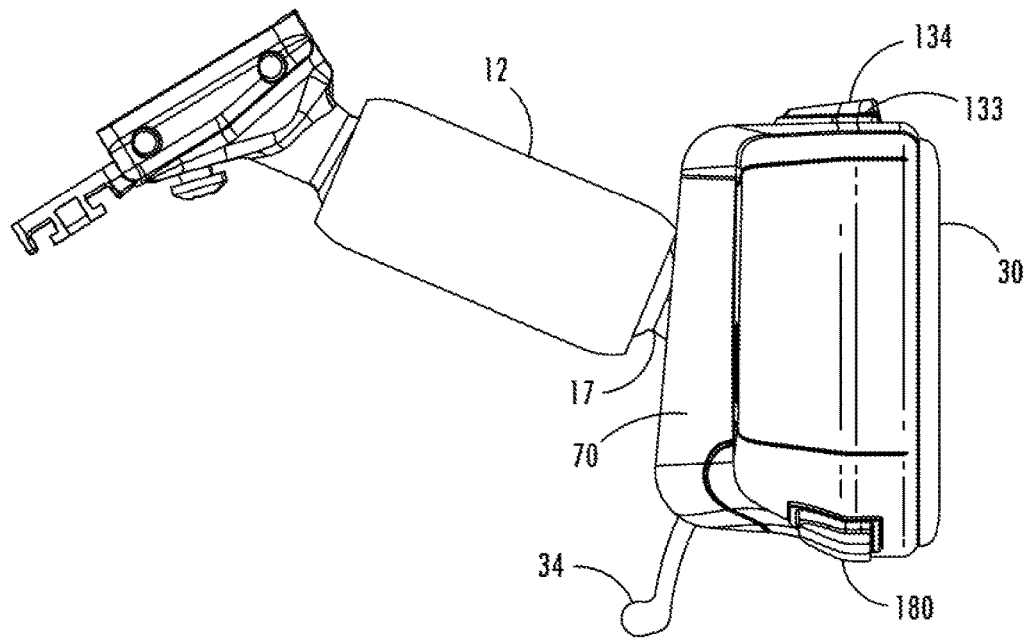
FIG. 10 is a side plan view of the display mirror assembly with the actuator device in a rearward position.
Figure 11:
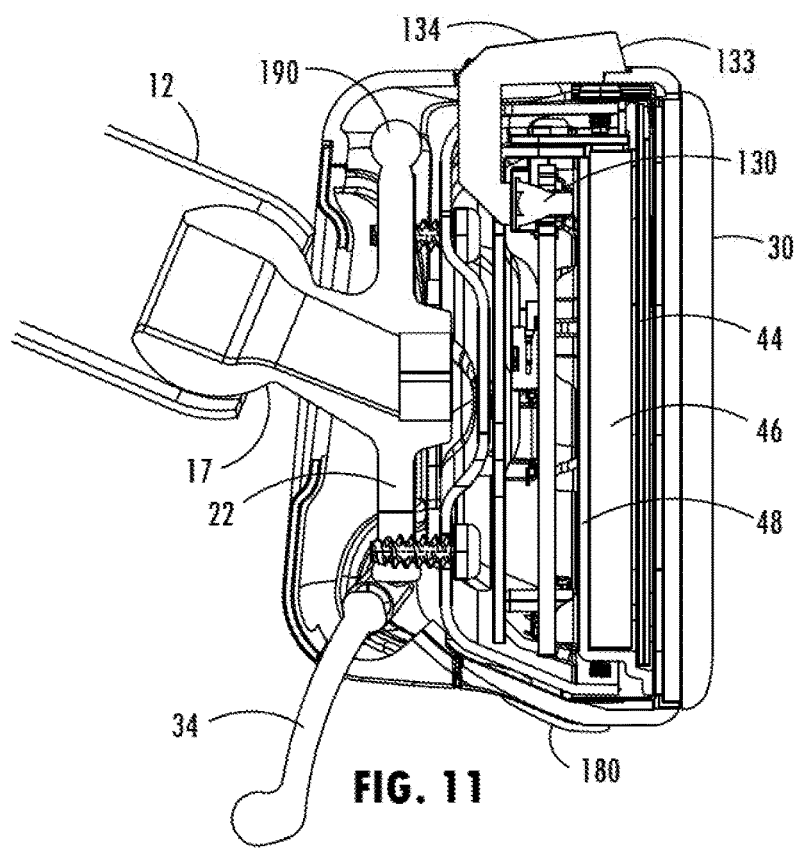
FIG. 11 is a side cross-sectional elevational view of the display mirror assembly with the actuator device in a rearward position.
Figure 11A:
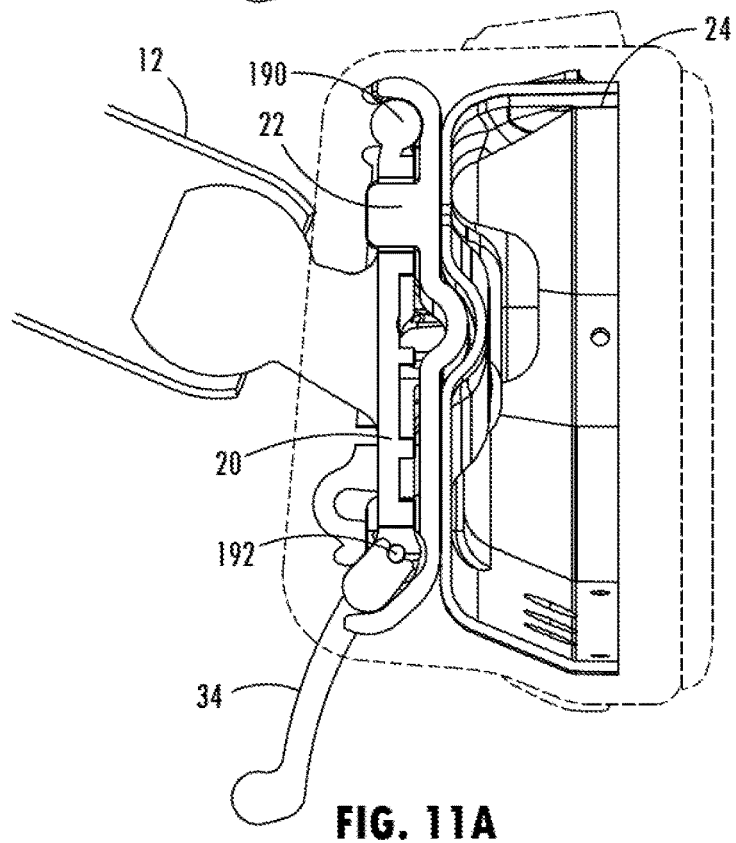
FIG. 11A is a side cross-sectional elevational view of the display mirror assembly with the actuator device in the rearward position with the housing and internal components removed.
Figure 12:
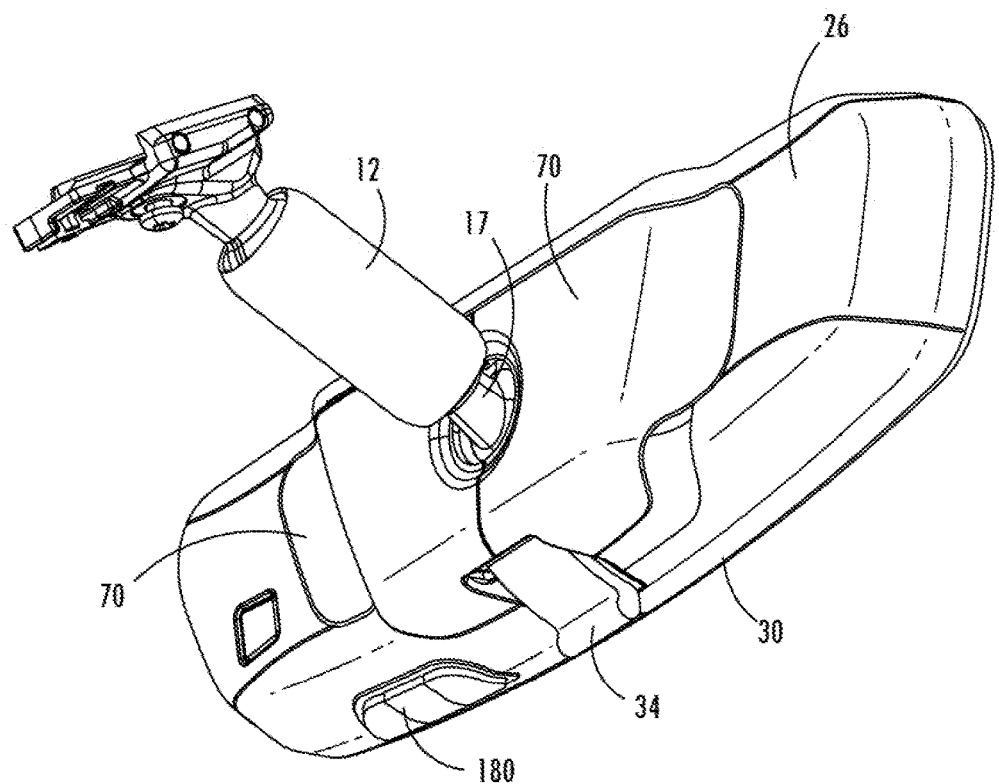
FIG. 12 is a bottom perspective view of the display mirror assembly of the present disclosure with an actuator device in a forward position.
Figure 13:
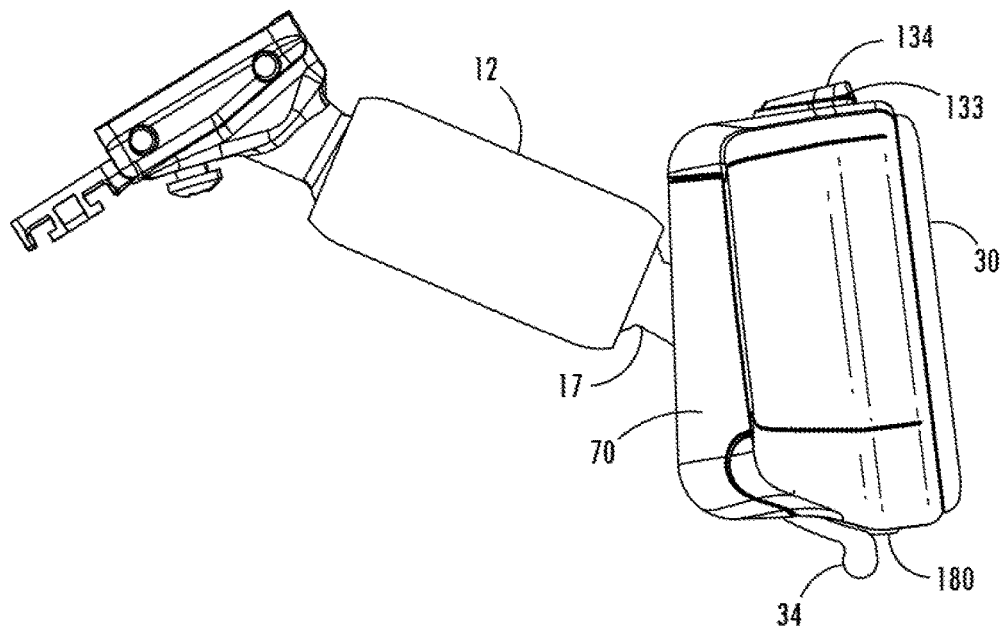
FIG. 13 is a side plan view of the display mirror assembly with the actuator device in a forward position.
Figure 14:
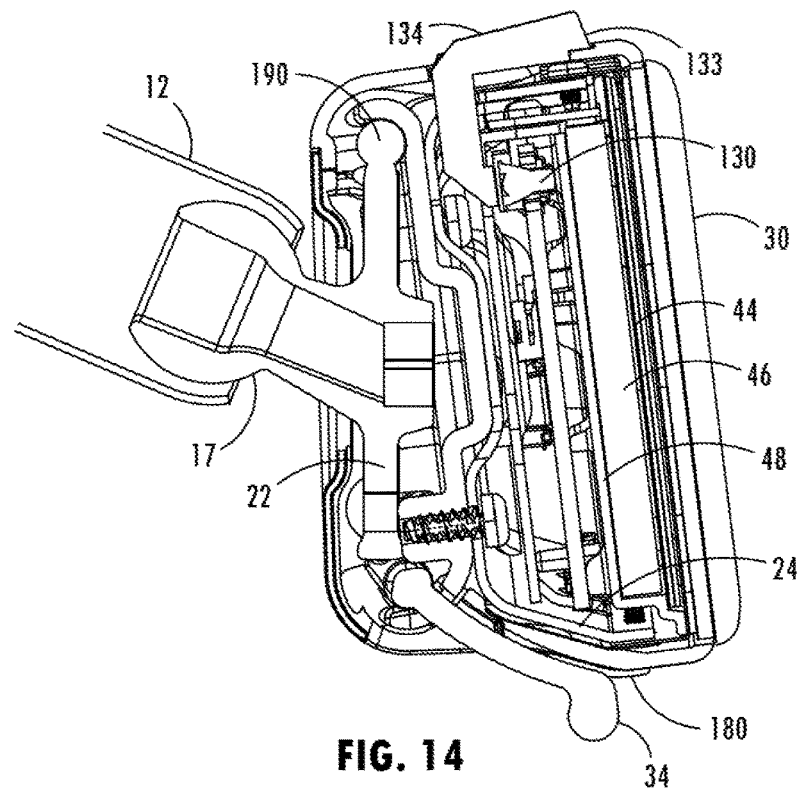
FIG. 14 is a side cross-sectional elevational view of the display mirror assembly with the actuator device in a forward position.
Figure 14A:
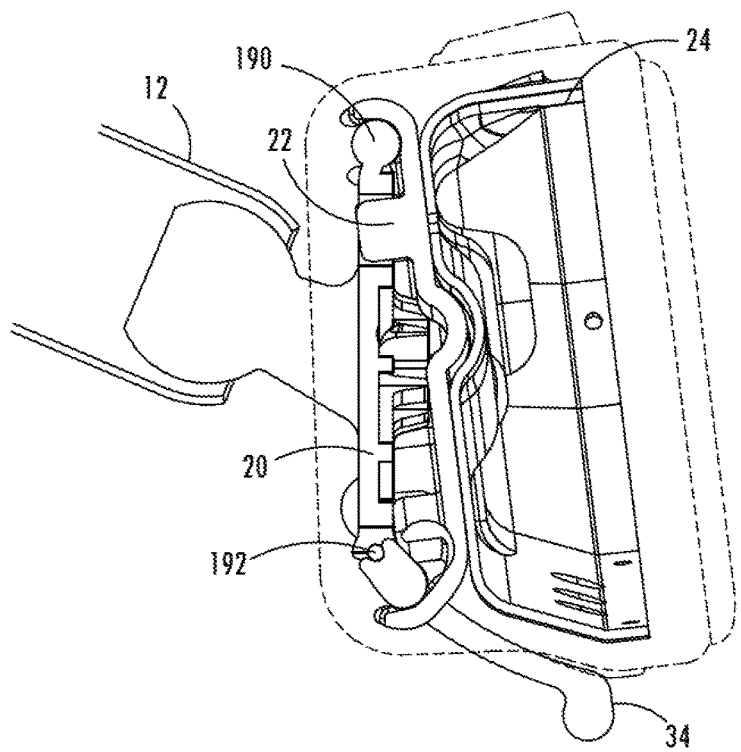
FIG. 14A is a side cross-sectional elevational view of the display mirror assembly with the actuator device in the forward position with the housing and internal components removed.

As shown in FIGS. 8-8C, the optic stack 46 includes a front side 120 adjacent the display 44, a rear side 122 adjacent the optic tray 48, and an outer perimeter 124. The optic stack 46 further includes engagement tabs or an adhesive 126 extending therefrom around at least a portion of the outer perimeter 124. In alternate embodiments, the engagement tabs 126 for engaging the front shield 40, or the screw-receiving elements, or both, could be provided on different components of the display module 32.

As shown in FIGS. 6, 6A, and 8C, a glare sensor 130 is provided on a rear side 132 of the optic tray 48. The glare sensor 130 includes a light receiving area 133, which receives light through a light pipe 134 that extends outside the rear housing 26. The light pipe 134 receives light from headlamps of a trailing vehicle, and relays the same to the glare sensor 130, which measures information regarding the likely glare visible on the glass element 30 and communicates this information to the display mirror assembly 10 so that the display mirror assembly 10 can be optimized to allow viewing of the display 44 through the glass element 30. The light pipe 134 extends above the rear housing 26 and the carrier plate 24. However, it is contemplated that the light pipe 134 could extend to any portion of the exterior of the display mirror assembly 10. The optical vertical/horizontal pattern of the glare sensor 130 is symmetrical, so that orientation of the glare sensor 130 is not significant. The glare sensor 130 could also be an imager on a rear portion of the vehicle, wherein a signal representative of the received light is communicated from the glare sensor 130 to the display mirror assembly 10.

As shown in FIGS. 8A and 8B, the heat sink 52 is disposed rearwardly from the optic stack 46, and dissipates heat generated by the main PCB 50 and other components of the display module 32. The heat sink 52 has a generally planar body with a front side and a top wall 140. A plurality of apertures 142 open upwardly from the top wall 140 of the heat sink 52, for mechanical engagement via mechanical fasteners 144 with the carrier plate 24.

The main PCB 50 operates to provide electrical power and control for the components of the display module 32 and for the glass element 30. As shown in FIGS. 8-8C, the main PCB 50 is generally planar, with a front side 145, a rear side 146, and side edges 148. The front side 145 is facing the optic tray 48 and the rear side 146 is facing the heat sink 52. Electrical components are generally oriented on the rear side 146 of the main PCB 50, although these components could be arranged on the front side 145. The main PCB 50 includes an electrical connector 150 for operable electrical engagement with the electrical element wires of the glass element 30, an electrical connector 151 for operable electrical engagement with the secondary PCB 110, and an electrical connector 152 for operable electrical engagement with a wiring harness 154. Additional functional elements that may be provided on the display mirror assembly 10 may also be electrically connected to the main PCB 50, such as the glare sensor 130 and any other functional buttons or features of the display mirror assembly 10. The main PCB 50 further includes cutouts 156 along the top edge, to permit passage of the screws used to secure the carrier plate 24 to the components of the display module 32.

The carrier plate 24 functions to support the display mirror assembly 10 and to shield the display module 32 from RF radiation. Referring again to FIGS. 7 and 7A, the carrier plate 24 also serves to encapsulate the display module 32, and further interlock the components of the display mirror assembly 10. The carrier plate 24 is formed from a material which is suitable to block such radiation and provide the desired support for the display mirror assembly 10, such as steel. As a non-limiting example, the carrier plate 24 can be formed from stamped steel. Notably, the carrier plate 24 generally supports the display mirror assembly 10 on the mount 12.

The carrier plate 24 includes a rear wall 160 having an outer perimeter, and a peripheral wall 162 extending forwardly from the rear wall 160 about at least a portion of the outer perimeter 80. The peripheral wall 162 has slots 164 therein, which correspond to the upstanding tabs 103 along the top edge of the carrier plate 24. The carrier plate 24 further includes at least one mechanical fastener aperture therethrough to accommodate at least one mechanical fastener 166 that extends through the carrier plate 24 and into the components of the display module 32 to secure the carrier plate 24 to the display module 32.

The rear housing 26 includes a forwardly directed cavity 170, into which all or a portion of the front shield 40, the carrier plate 24, and the display module 32 supported therebetween are inserted. The rear housing 26 includes mechanically engaging features that couple with corresponding engagement features located on the carrier plate 24. The rear housing 26 and the rear coverplates 70 are generally decorative in nature and do not provide any load bearing support. A button assembly 180 is positioned in the rear housing 26.

Figure 15:
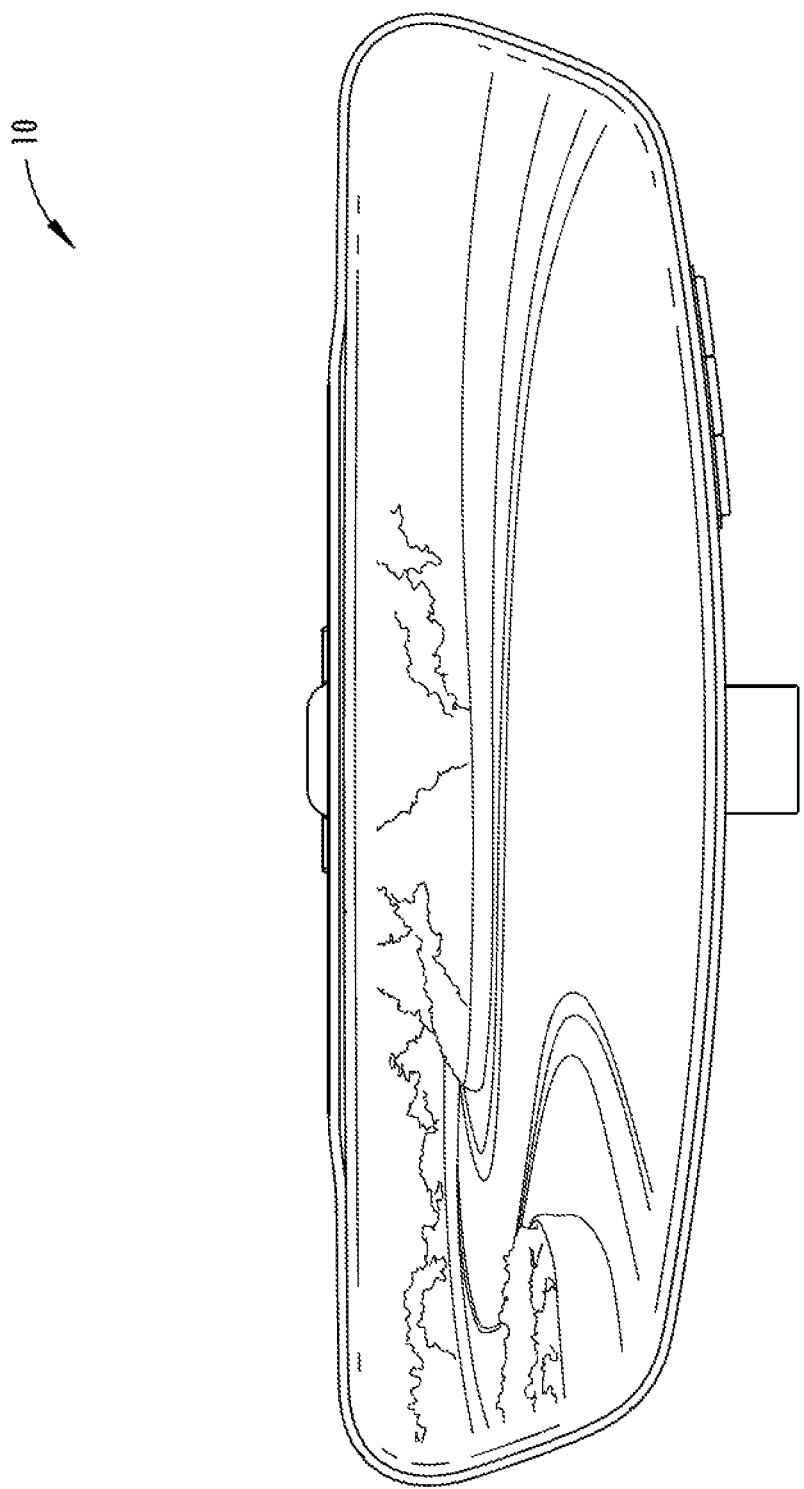
FIG. 15 is a front elevational view of a display mirror assembly of the present disclosure illustrating the distance from the active area to the edge.

With respect to the following description, the display mirror assembly 10 is considered "on-axis" when a line perpendicular to the plane of the glass element 30 extends toward the eyes of a viewer. Due to the display 44 being viewed through the glass element 30, any glare on the glass element 30 may interfere with the visibility of the display 44. When the display mirror assembly 10 is on-axis and is being used during night time driving conditions, headlights from a trailing vehicle (i.e., a vehicle driving behind the vehicle with the display mirror assembly 10) can cause a glare which is visible to the driver. According to one embodiment of the present disclosure, the actuator device 34, as shown in FIGS. 9-14A, is operably coupled to the display mirror assembly 10. When actuated, the actuator device 34 moves at least the glass element 30 off-axis (i.e., away from a direct line toward the driver's eyes). Typically, actuation of the actuator device 34 tilts the glass element 30 upwards (FIGS. 12-14A), to move the glass element 30 to an off-axis position. However, it should be appreciated that the actuator device 34 can be configured to move the glass element 30 in any direction with respect to the axis. The actuator device 34 can also be configured to move the display 44 upon activation. The actuator device 34 can also be configured to turn the display 44 on or off. Thus, when the actuator device 34 is actuated to move the glass element 30 off-axis, the display 44 can be turned off. As shown in FIGS. 15 and 16, the display mirror assembly 10 has a display area that complements the shape of the glass element 30 and nearly fills the front surface of the glass element 30, leaving only a small peripheral edge.

Additionally, to provide information to the viewer of the display mirror assembly 10, the display mirror assembly 10 may include information regarding the field of view, such as a partially transmissive graphic overlay or an image on the display visible on the viewing area when the display mirror assembly 10 is in use.

With reference to FIGS. 9-11A, when the actuator device 34 is in the rear position, the display mirror assembly 10 is in an on-axis viewing mode. It will be understood that the display mirror assembly 10 may be utilized by a user with either the display 44 activated, or with the display 44 not activated, in which case the reflective capabilities of the glass element 30 will be utilized. When moving to the off-axis mode, the actuator device 34 is drawn forward by a user (FIGS. 12-14A), which results in the second support member 22 (which is statically coupled with the mounting member 17) being rotated away from the first support member 20 about a pivot axis 190. As the second support member 22 rotates away, so too does the carrier plate 24 and the rest of the display mirror assembly 10. The rear housing 26 also moves with the carrier plate 24. A user simply performs the reverse operation to draw the display mirror assembly 10 back to an on-axis viewing mode. The rotation of the second support member 22 relative to the first support member 20 is guided and limited by guide pins 192.

The display mirror assembly is constructed generally in the following manner. The glass element is ground, such that the glass element includes a ground edge with a 0.7 mm offset. The glass element is then adhered to the front shield with either a foam adhesive or a liquid adhesive. The display, the optic stack, and the optic tray are attached to the front shield. The main PCB is attached to the optic tray and flex connections of the display are connected. The secondary PCB (or LED PCB) is then attached to the heat sink with a thermally conductive adhesive. The secondary PCB and heat sink subassembly is then attached to the optic tray with mechanical fasteners, heat stakes, or other mechanical attachment methods. An electro-optic connection is then made between the glass element and the main PCB through a flex cable, a small wire, or other electrically conductive method. A socket plate is then mechanically attached to a rear carrier plate and the carrier plate is mechanically attached to the front shield by low-profile mechanical fasteners, louvered snaps, or other low-profile attachment methods. The rear housing is attached to a rear portion of the carrier plate and attached via mechanical fasteners. A vehicle wire harness and camera jumper harness are attached to the main PCB and the glare sensor is snapped into the rear housing. A button subassembly is snapped into the rear housing or the carrier plate, and the rear coverplates are placed on the back of the rear housing to cover any mechanical fasteners, as well as vehicle and/or camera connectors. The resulting display mirror assembly has improved displays with a small distance from the active area to the edge of the display mirror assembly, and also from the active area to the edge of the glass element.

The resulting construction provides an electro-optic connection with a low profile. Additionally, the carrier plate is designated as a main structural member of the display mirror assembly. The rear carrier plate and the front shield are mechanically attached together to provide a load path from the glass element to the mount and to improve electrical emissions performance. The socket plate is mechanically attached to the rear carrier plate. Consequently, the need for the rear housing to be a structural member is eliminated. As a result, the snaps and retention ribs that otherwise may have been present in the rear housing can also be eliminated. Because of the socket plate construction, blind connection of the wires is eliminated, and the unit can be tested in production for activation forces before the glass element is assembled. The rear housing multi-piece design acts as a decorative cover, but does not provide a structural function, other than to cover the rear portion of the carrier plate. In addition, the glare sensor construction generally directs light via a light pipe to an internal glare sensor. This entire construction results in a reduced adhesion area from the glass element to the front shield, thus lowering costs and improving manufacturing time.

The present disclosure may be used with a rearview assembly such as that described in U.S. Pat. Nos. 9,174,577; 8,925,891; 8,814,373; 8,201,800; and 8,210,695; U.S. Patent Application Publication No. 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the disclosure described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A display mirror assembly comprising:
   a mount operably coupled to a vehicle interior, the mount including one of a ball and a socket extending forwardly therefrom;
   an engagement plate pivotally coupled with the mount via the other of a ball and a socket extending rearwardly from the engagement plate, the engagement plate including a first support member and a second support member pivotally coupled to the first support member;
   a carrier plate operably coupled with the engagement plate, the carrier plate supporting a rear housing on a rear portion thereof;
   a glass element operably coupled with the carrier plate;
   a display module being configured to be turned to an on state and an off state;
   a glare sensor disposed between an optic tray and the carrier plate, the glare sensor being in optical communication with a light pipe that extends outside the rear housing; and
   an actuator device disposed on a bottom surface of the rear housing and operably coupled with the glass element, wherein the actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

2. The display mirror assembly of claim 1, wherein the glass element is a partially reflective, partially transmissive element.

3. The display mirror assembly of claim 1, wherein an edge of the glass element has a chrome ring edge treatment.

4. The display mirror assembly of claim 1, wherein the display module has a shape that corresponds to the shape of the glass element, and wherein the display module is one of an LCD, LED, OLED, plasma, and DLP display element.

5. The display mirror assembly of claim 1, further comprising:
   a main printed circuit board arranged behind the display module and oriented such that a planar extent of the main printed circuit board is generally parallel with a planar extent of the display module.

6. The display mirror assembly of claim 5, further comprising:
   a secondary circuit board proximate the main printed circuit board and having a planar extent that is generally orthogonal to the planar extent of the main printed circuit board.

7. The display mirror assembly of claim 1, further comprising:
   an optic stack disposed behind the display module and supported by the optic tray.

8. A display mirror assembly comprising:
   a mount operably coupled to a vehicle interior;
   a carrier plate operably coupled with the mount, the carrier plate at least partially bearing the weight of a rear housing on a rear portion thereof;
   a glass element operably coupled with the carrier plate;
   an optic stack disposed behind the glass element;
   a glare sensor operably coupled with the glass element and being in optical communication with a light pipe that extends above the carrier plate;
   a display module being configured to be turned to an on state and an off state; and
   an actuator device disposed on a bottom surface of the rear housing and operably coupled with the glass element, wherein the actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

9. The display mirror assembly of claim 8, wherein the glass element is a partially reflective, partially transmissive element.

10. The display mirror assembly of claim 8, wherein an edge of the glass element has a chrome ring edge treatment.

11. The display mirror assembly of claim 8, wherein the display module has a shape that corresponds to the shape of the glass element, and wherein the display module is one of an LCD, LED, OLED, plasma, and DLP display element.

12. The display mirror assembly of claim 8, further comprising:
   a main printed circuit board arranged behind the display module and oriented such that a planar extent of the main printed circuit board is generally parallel with a planar extent of the display module.

13. The display mirror assembly of claim 12, further comprising:
a secondary circuit board proximate the main printed circuit board and having a planar extent that is generally orthogonal to the planar extent of the main printed circuit board.

14. A display mirror assembly comprising:
a mount operably coupled to a vehicle interior;
a carrier plate operably coupled with the mount, the carrier plate at least partially bearing the weight of a rear housing on a rear portion thereof;
a glass element operably coupled with the carrier plate;
a glare sensor operably coupled with the carrier plate and being in optical communication with a light pipe that is exposed to an exterior of the rear housing;
a display module being configured to be turned to an on state and an off state; and
an actuator device disposed on a bottom surface of the rear housing and operably coupled with the glass element, wherein the actuator device is adjustable to tilt the glass element in one direction, thereby moving the glass element to an off-axis position which approximately simultaneously changes the on/off state of the display module, and wherein the actuator device is also adjustable to tilt the glass element in another direction, thereby moving the glass element to an on-axis position which approximately simultaneously changes the on/off state of the display module.

15. The display mirror assembly of claim 14, wherein the glass element is a partially reflective, partially transmissive element.

16. The display mirror assembly of claim 14, wherein an edge of the glass element has a chrome ring edge treatment.

17. The display mirror assembly of claim 14, wherein the display module has a shape that corresponds to the shape of the glass element and includes a display, and wherein the display is one of an LCD, LED, OLED, plasma, and DLP display element.

18. The display mirror assembly of claim 14, further comprising:
a main printed circuit board arranged behind the display module and oriented such that a planar extent of the main printed circuit board is generally parallel with a planar extent of the display module.

19. The display mirror assembly of claim 18, further comprising:
a secondary circuit board proximate the main printed circuit board and having a planar extent that is generally orthogonal to the planar extent of the main printed circuit board.

* * * * *